United States Patent
Smith et al.

(10) Patent No.: US 12,008,478 B2
(45) Date of Patent: Jun. 11, 2024

(54) SYSTEMS AND METHODS FOR TRAINING GENERATIVE MODELS USING SUMMARY STATISTICS AND OTHER CONSTRAINTS

(71) Applicant: Unlearn.AI, Inc., San Francisco, CA (US)

(72) Inventors: Aaron M. Smith, Corte Madera, CA (US); Anton D. Loukianov, San Mateo, CA (US); Charles K. Fisher, Truckee, CA (US); Jonathan R. Walsh, El Cerrito, CA (US)

(73) Assignee: Unlearn.AI, Inc., San Francisco, CA (US)

( * ) Notice: Subject to any disclaimer, the term of this patent is extended or adjusted under 35 U.S.C. 154(b) by 782 days.

(21) Appl. No.: 17/074,364

(22) Filed: Oct. 19, 2020

(65) Prior Publication Data
US 2021/0117842 A1  Apr. 22, 2021

Related U.S. Application Data

(60) Provisional application No. 62/923,337, filed on Oct. 18, 2019.

(51) Int. Cl.
| | | |
|---|---|---|
| *G06N 20/00* | (2019.01) | |
| *G06F 18/211* | (2023.01) | |
| *G06N 3/088* | (2023.01) | |
| *G06N 7/08* | (2006.01) | |

(52) U.S. Cl.
CPC .......... *G06N 3/088* (2013.01); *G06F 18/211* (2023.01); *G06N 7/08* (2013.01); *G06N 20/00* (2019.01)

(58) Field of Classification Search
CPC .......... G06N 3/088; G06N 20/00; G06N 7/08; G06F 18/211
See application file for complete search history.

(56) References Cited

U.S. PATENT DOCUMENTS

| | | |
|---|---|---|
| 7,634,464 B2 | 12/2009 | Chen et al. |
| 9,495,582 B2 | 11/2016 | Guissin et al. |
| 11,120,528 B1 | 9/2021 | Seely et al. |
| 11,196,656 B1 | 12/2021 | Jain et al. |
| 11,200,511 B1 * | 12/2021 | London .................. G06N 7/01 |

(Continued)

FOREIGN PATENT DOCUMENTS

| | | |
|---|---|---|
| CN | 111758108 A | 10/2020 |
| EP | 3740908 A1 | 11/2020 |

(Continued)

OTHER PUBLICATIONS

Herlau, Tue, Morten Mørup, and Mikkel N. Schmidt. "Bayesian Dropout." arXiv e-prints (2015): arXiv-1508. (Year: 2015).*

(Continued)

*Primary Examiner* — Casey R. Garner
(74) *Attorney, Agent, or Firm* — KPPB LLP

(57) ABSTRACT

Systems and methods for training and utilizing constrained generative models in accordance with embodiments of the invention are illustrated. One embodiment includes a method for training a constrained generative model. The method includes steps for receiving a set of data samples from a first distribution, identifying a set of constraints from a second distribution, and training a generative model based on the set of data samples and the set of constraints.

20 Claims, 8 Drawing Sheets

(56) References Cited

U.S. PATENT DOCUMENTS

| | | |
|---|---|---|
| 11,501,429 B2 | 11/2022 | Stamatoyannopoulos et al. |
| 11,574,462 B1 | 2/2023 | Bhatia et al. |
| 11,610,126 B1 | 3/2023 | Heckerman et al. |
| 11,636,309 B2 | 4/2023 | Fisher et al. |
| 11,868,900 B1 | 1/2024 | Smith et al. |
| 2004/0059696 A1* | 3/2004 | Kropaczek ............ G21D 3/001 700/28 |
| 2005/0047646 A1* | 3/2005 | Jojic .................... G06F 18/295 382/173 |
| 2010/0235310 A1 | 9/2010 | Gage et al. |
| 2011/0116522 A1 | 5/2011 | Riggs et al. |
| 2013/0311968 A1 | 11/2013 | Sharma |
| 2014/0257128 A1 | 9/2014 | Moxon et al. |
| 2014/0279777 A1 | 9/2014 | Cornebise et al. |
| 2015/0185716 A1 | 7/2015 | Wichmann et al. |
| 2016/0217384 A1 | 7/2016 | Leonard et al. |
| 2016/0222448 A1 | 8/2016 | Horvath |
| 2017/0091615 A1 | 3/2017 | Liu et al. |
| 2017/0161635 A1 | 6/2017 | Oono et al. |
| 2017/0255871 A1* | 9/2017 | Macready ............... G06N 7/01 |
| 2017/0344706 A1 | 11/2017 | Torres et al. |
| 2017/0364043 A1 | 12/2017 | Ganti et al. |
| 2017/0364803 A1 | 12/2017 | Calmon et al. |
| 2017/0372193 A1 | 12/2017 | Mailhe et al. |
| 2018/0046780 A1 | 2/2018 | Graiver et al. |
| 2018/0081914 A1 | 3/2018 | Zoll et al. |
| 2018/0082172 A1* | 3/2018 | Patel ..................... G06N 3/047 |
| 2018/0150728 A1 | 5/2018 | Vahdat |
| 2018/0204138 A1 | 7/2018 | Nugent |
| 2018/0299152 A1 | 10/2018 | Libal et al. |
| 2018/0314573 A1 | 11/2018 | Chang et al. |
| 2018/0316781 A1 | 11/2018 | Salem |
| 2018/0336319 A1 | 11/2018 | Itu et al. |
| 2019/0018933 A1 | 1/2019 | Oono et al. |
| 2019/0130281 A1 | 5/2019 | Yang et al. |
| 2019/0220733 A1 | 7/2019 | Fisher et al. |
| 2019/0244680 A1* | 8/2019 | Rolfe .................... G06N 3/045 |
| 2019/0283247 A1 | 9/2019 | Chang et al. |
| 2019/0303471 A1 | 10/2019 | Lee et al. |
| 2019/0303798 A1 | 10/2019 | Xie et al. |
| 2020/0143498 A1 | 5/2020 | Alkan et al. |
| 2020/0401916 A1* | 12/2020 | Rolfe .................... G06N 7/01 |
| 2021/0057108 A1 | 2/2021 | Fisher et al. |
| 2021/0158906 A1* | 5/2021 | Xie ...................... G16H 10/20 |
| 2021/0241139 A1 | 8/2021 | Jain et al. |
| 2021/0256453 A1 | 8/2021 | Morgan et al. |
| 2022/0003894 A1 | 1/2022 | Shapiro et al. |
| 2022/0051796 A1 | 2/2022 | Zhu et al. |
| 2022/0121955 A1 | 4/2022 | Chavoshi et al. |
| 2022/0172085 A1 | 6/2022 | Fisher et al. |
| 2022/0187776 A1 | 6/2022 | Bagne |
| 2022/0188601 A1 | 6/2022 | Adler et al. |
| 2022/0300329 A1 | 9/2022 | Abhishek Raja |
| 2022/0410385 A1 | 12/2022 | Shimura |
| 2023/0004796 A1 | 1/2023 | Mayer et al. |
| 2023/0118864 A1 | 4/2023 | Zhang et al. |
| 2023/0209035 A1 | 6/2023 | Kaabi et al. |
| 2023/0245258 A1 | 8/2023 | Ma et al. |
| 2023/0245777 A1 | 8/2023 | Foschini et al. |

FOREIGN PATENT DOCUMENTS

| | | |
|---|---|---|
| EP | 4256418 A2 | 10/2023 |
| JP | 2021511584 A | 5/2021 |
| JP | 202231730 A | 2/2022 |
| JP | 7305656 B2 | 6/2023 |
| JP | 2023551514 A | 12/2023 |
| WO | 0229556 A2 | 4/2002 |
| WO | 2014114295 A1 | 7/2014 |
| WO | 2016145379 A1 | 9/2016 |
| WO | 2019143737 A1 | 7/2019 |
| WO | 2020115487 A1 | 6/2020 |
| WO | 2021041128 A1 | 3/2021 |
| WO | 2021077097 A1 | 4/2021 |
| WO | 2022003528 A1 | 1/2022 |
| WO | 2022120350 A2 | 6/2022 |
| WO | 2022125806 A1 | 6/2022 |
| WO | 2022120350 A3 | 8/2022 |
| WO | 2022210425 A1 | 10/2022 |
| WO | 2022261420 A1 | 12/2022 |
| WO | 2019143737 A8 | 3/2023 |

OTHER PUBLICATIONS

Zhu, Yinhao, Nicholas Zabaras, Phaedon-Stelios Koutsourelakis, and Paris Perdikaris. "Physics-Constrained Deep Learning for High-dimensional Surrogate Modeling and Uncertainty Quantification without Labeled Data." arXiv preprint arXiv:1901.06314 (2019). (Year: 2019).*

International Preliminary Report on Patentability for International Application PCT/US2019/013870 Report dated Jul. 21, 2020, dated Jul. 30, 2020, 4 Pgs.

International Search Report and Written Opinion for International Application No. PCT/US2019/013870, Search completed Mar. 18, 2019, dated Mar. 27, 2019, 9 Pgs.

International Search Report and Written Opinion for International Application No. PCT/US2020/047054, Search completed Oct. 8, 2020, dated Nov. 23, 2020, 10 Pgs.

International Search Report and Written Opinion for International Application No. PCT/US2020/056354, Search completed Dec. 21, 2020, dated Jan. 25, 2021, 9 pgs.

Akhtar et al., "Improving the Robustness of Neural Networks Using K-Support Norm Based Adversarial Training," IEEE Access; Publication [online]. Dec. 28, 2016, pp. 1-9.

Arici et al., "Associative Adversarial Networks," arXiv:1611.06953v1 [cs.LG], Nov. 18, 2016, 8 pgs.

Arjovsky et al., "Wasserstein GAN," arXiv:1701.07875v1 [stat.ML], Jan. 26, 2017, 30 pgs.

Bengio, et al., "Greedy Layer-Wise Training of Deep Networks," Advances in Neural Information Processing Systems, 2007, 13 pgs.

Chatterjee et al., "Explaining Complex Distributions with Simple Models," 2008, Econophysics, pp. 1-15.

Cho et al., "Gaussian-Bernoulli deep Boltzmann machine," Proceedings of the 2013 International Joint Conference on Neural Networks (IJCNN), Dallas, Texas, Aug. 4-9, 2013, 9 pgs.

Dutt et al., "Generative Adversarial Networks (GAN) Review," CVR Journal of Science and Technology, Dec. 2017, vol. 13, pp. 1-5.

Fisher et al., "Boltzmann Encoded Adversarial Machines," Preprint arXiv:1804.08682, 2018, 17 pgs.

Gabrie et al., "Training Restricted Boltzmann Machines via the Thouless-Anderson-Palmer Free Energy," Advances in Neural Information Processing Systems, vol. 28, 2015, 9 pgs.

Goodfellow et al., "Generative Adversarial Nets," Advances in Neural Information Processing Systems, vol. 27, 2014, 9 pgs.

Greydanus, "Generative Adversarial Networks for the MNIST dataset," "Mnist gan," http://github.com/greydanus/mnist-gan (2017), 2 pgs.

Hinton, "A Practical Guide to Training Restricted Boltzmann Machines," Neural networks: Tricks of the trade, pp. 599-619, Springer, Berlin, Heidelberg, 2012.

Hinton et al., "A Fast Learning Algorithm for Deep Belief Nets," Neural Computation 18, pp. 1527-1554 (2006).

Hinton et al., "Reducing the Dimensionality of Data with Neural Networks," Science, vol. 313, No. 5786, Jul. 28, 2006, pp. 504-507.

Kullback et al., "On Information and Sufficiency," The Annals of Mathematical Statistics, vol. 22, No. 1, 1951, pp. 79-86.

Li et al., "Temperature based Restricted Boltzmann Machines," Scientific Reports Jan. 13, 2016, vol. 19133, 12 pgs., DOI: 10.1038/srep19133.

Lopez-Ruiz et al., "Equiprobability, Entropy, Gamma Distributions and Other Geometrical Questions in Multi-Agent Systems," Entropy, 2009, vol. 11, pp. 959-971, doi:10.3390/e11040959.

Montavon et al., "Wasserstein Training of Restricted Boltzmann Machines," Advances in Neural Information Processing Systems, vol. 29, 2016, 9 pgs.

(56) References Cited

OTHER PUBLICATIONS

Nguyen et al., "Latent Patient Profile Modelling and Applications with Mixed-Variate Restricted Boltzmann Machine," Advances in Knowledge Discovery and Data Mining, 2013, pp. 123-135.

Nguyen et al., "Supervised Restricted Boltzmann Machines," UAI, 2017, 10 pgs.

Rogers et al., "Combining patient-level and summary-level data for Alzheimer's disease modeling and simulation: a beta regression meta-analysis," Journal of Pharmacokinetics and Pharmacodynamics 39.5 (2012), 20 pgs.

Salakhutdinov et al., "Deep Boltzmann Machines," Proc. International Conference on Artificial Intelligence and Statistics, 2009, pp. 448-455.

Sutskever, et al., "The Recurrent Temporal Restricted Boltzmann Machine," Advances in Neural Information Processing Systems, 2009, pp. 1601-1608.

Tran et al., "Mixed-Variate Restricted Boltzmann Machines," Asian Conference on Machine Learning, JMLR: Workshop and Conference Proceedings 20, 2011, pp. 213-229.

Tuzman, Karen Tkach, "Broadening role for external control arms in clinical trials," Biocentury, Tools & Techniques, Reprint from Jul. 15, 2019, 5 pgs.

Zhang et al., "Predictive Deep Boltzmann Machine for Multiperiod Wind Speed Forecasting," IEEE Transactions on Sustainable Energy, 2015, vol. 6, Issue 4, pp. 1416-1425, doi: 10.31109/TSTE.2015.244387.

Extended European Search Report for European Application No. 19741291.9, Search completed Sep. 8, 2021, dated Sep. 17, 2021, 12 Pgs.

International Preliminary Report on Patentability for International Application PCT/US2020/047054, Report dated Feb. 17, 2022, dated Mar. 3, 2022, 5 Pgs.

Grover et al., "Flow-GAN: Combining Maximum Likelihood and Adversarial Learning in Generative Models," arXiv:1705.08868, May 24, 2017, 10 pages.

Kim et al., "Deep Directed Generative Models with Energy-Based Probability Estimation," arXiv:1606.03439, Jun. 10, 2016, 9 pages.

Liu et al., "A Survey of Deep Neural Network Architectures and their Applications," Neurocomputing, vol. 234, Apr. 19, 2017, pp. 11-26.

Miotto et al., "Deep Learning for Healthcare: Review, Opportunities and Challenges," Briefings in Bioinformatics, vol. 19, No. 6, 2017, 11 pgs.

International Preliminary Report on Patentability for International Application PCT/US2020/056354, Report dated Apr. 19, 2022, dated Apr. 28, 2022, 6 Pgs.

International Preliminary Report on Patentability for International Application PCT/US2021/072678, Report dated May 30, 2023, dated Jun. 15, 2023, 9 Pgs.

International Search Report and Written Opinion for International Application No. PCT/US2023/069016, Search completed Sep. 18, 2023, dated Oct. 18, 2023, 11 Pgs.

International Search Report and Written Opinion for International Application No. PCT/US2023/070276, Search completed Oct. 6, 2023, dated Nov. 8, 2023, 16 Pgs.

International Search Report and Written Opinion for International Application PCT/US2021/072678, search completed Jan. 31, 2022, dated Jul. 1, 2022, 13 Pgs.

Ackley et al., "A learning algorithm for boltzmann machines", Cognitive Science, vol. 9, No. 1, 1985, pp. 147-169.

Allison et al., "Handling Missing Data by Maximum Likelihood", SAS Global Forum 2012: Statistics and Data Analysis, 21 Pgs.

Amin et al., "Quantum Boltzmann Machine", [retrieved on Jun. 10, 2023]. Retrieved from the Internet: <URL:https://journals.aps.org/prx/pdf/10.1103/PhysRevX.8.021050>, May 23, 2018, pp. 021050-1 to 021050-11.

Duan et al., "Utilizing Dynamic Treatment Information for MACE Prediction of Acute Coronary Syndrome", 2019, BMC Medical Informatics and Decision Making, pp. 1-11 (Year: 2019).

Fisher et al., "Machine Learning for Comprehensive Forecasting of Alzheimers Disease Progression", Scientific Reports, vol. 9, No. 1, 2019, pp. 1-14.

Fisher et al., "Machine Learning for Comprehensive Forecasting of Alzheimer's Disease Progression", Sep. 20, 2019, Scientific Reports, pp. 1-41. (with Supporting Information, Year: 2019).

Ghojogh et al., "Restricted Boltzmann Machine and Deep Belief Network: Tutorial and Survey", arXiv preprint arXiv:2107.12521, 2022, 16 Pgs.

Goodfellow et al., "Multi-Prediction Deep Boltzmann Machines", [retrieved on Jun. 10, 2023]. Retrieved from the Internet: <URL:https://proceedings.neurips.cc/paper/2013/file/0bb4aec1710521c12ee76289d9440817-Paper.pdf> Dec. 5, 2013, pp. 1-9.

Graham et al., "Analysis with missing data in drug prevention research", NIDA Research Monograph, Feb. 1994, vol. 142, pp. 325-366.

Gupta, "Intention-to-treat concept: a Review", Perspectives in Clinical Research, Jul. 2011, vol. 2, No. 3, pp. 109-112, doi: 10.4103/2229-3485.83221.

Hinton et al., "A Fast Learning Algorithm for Deep Belief Nets", Neural Computation, vol. 18, 2006, pp. 1527-1554.

Hinton et al., "Training Products of Experts by Minimizing Contrastive Divergence", Training, vol. 14, No. 8, 2006, pp. 1771-1800.

Hoffman et al., "Training Compute-Optimal Large Language Models", arXiv preprint arXiv:2203.15556, 2022, 36 Pgs.

Jerez et al., "Missing data imputation using statistical and machine learning methods in a real breast cancer problem", Artificial Intelligence in Medicine, (Year: 2010), vol. 50, Issue 2, pp. 105-115.

Lamb et al., "GibbsNet: Iterative Adversarial Inference for Deep Graphical Models", arXiv preprint arXiv:1712.04120v1, 2017, 11 Pgs.

Liao et al., "Gaussian-Bernoulli RBMs Without Tears", arXiv preprint arXiv:2210.10318, 2022, 18 Pgs.

Lim et al., "Time-Series Forecasting with Deep Learning: A Survey", Jul. 28, 2021, The Royal Society Publishing, pp. 1-14 (Year: 2021).

Lipton et al., "Modeling Missing Data in Clinical Time Series with RNNs", Machine Learning for Healthcare. Jun. 13, 2016, vol. 56, 17 pgs.

Liu et al., "Image Inpainting for Irregular Holes Using Partial Convolutions", Proceedings of the European conference on computer vision (ECCV), 2018, 23 pgs.

Marlin et al., "Recommender systems: Missing Data and statistical Model Estimation", Proceedings of the Twenty-Second international joint conference on Artificial Intelligence, 2011, vol. Three (IJCAI'11), AAAI Press, pp. 2686-2691.

Melchior et al., "Gaussian-Binary Restricted Boltzmann Machines for Modeling Natural Image Statistics", PLoS ONE, vol. 12, No. 2, 2017, pp. 1-24.

Mnih et al., "Conditional restricted Boltzmann machines for structured output prediction", arXiv preprint arXiv:1202.3748, 2012, 9 Pgs.

Nakkiran et al., "Deep Double Descent: Where Bigger Models and More Data Hurt", arXiv preprint, arXiv:1912.02292, 2019, 24 Pgs.

Niu et al., "A review on the attention mechanism of deep learning", Neurocomputing, vol. 452, 2021, pp. 48-62, https://doi.org/10.1016/j.neucom.2021.03.091.

OPENAI, "Gpt-4 technical report", arXiv preprint arXiv:2303.08774, 2023, 100 Pgs.

Rombach et al., "High-Resolution Image Synthesis with Latent Diffusion Models", arXiv preprint arXiv:2112.10752, 2022, 45 Pgs.

Saharia et al., "Photorealistic text-to-image diffusion models with deep language understanding", arXiv preprint arXiv:2205.11487, 2022, 46 Pgs.

Salakhutdinov et al., "Deep boltzmann machines", Proceedings of Machine Learning Research, vol. 5, Apr. 2009, pp. 448-455.

Silva et al., "Predicting In-Hospital Mortality of ICU Patients: The PhysioNet/Computing in Cardiology Challenge 2012", Computing in Cardiology, 2012, vol. 39, pp. 245-248.

Sohl-Dickstein et al., "Deep Unsupervised Learning using Nonequilibrium Thermodynamics", arXiv preprint arXiv:1503.03585, 2015, 18 Pgs.

(56) References Cited

OTHER PUBLICATIONS

Song et al., "Generative Adversarial Learning of Markov Chains", Accessed at URL https://openreview.net/forum?id=S1L-hCNtl, 2017, 8 Pgs.

Sterne et al., "Multiple imputation for missing data in epidemiological and clinical research: potential and pitfalls", BMJ, 2009, 14 pages, doi: https://doi.org/10.1136/bmj.b2393 (Published Jun. 29, 2009).

Tan et al., "A tensor-based method for missing traffic data completion", Transportation Research Part C: Emerging Technologies, vol. 28, 2013, pp. 15-27, https://doi.org/10.1016/j.trc.2012.12.007.

Taylor et al., "Factored conditional restricted boltzmann machines for modeling motion style", In Proceedings of the 26th Annual International Conference on Machine Learning, ACM, 2009, pp. 1025-1032.

Taylor et al., "Modeling human motion using binary latent variables", In Advances in Neural Information Processing Systems, 2007, pp. 1345-1352.

Tieleman, "Training restricted boltzmann machines using approximations to the likelihood gradient", In Proceedings of the 25th international conference on Machine learning, ACM, 2008, pp. 1064-1071.

Tipirneni et al., "Self-supervised transformer for sparse and irregularly sampled multivariate clinical time-series", ACM Transactions on Knowledge Discovery from Data (TKDD), 2022, vol. 16, No. 6, 18 pgs.

Upadhya et al., "Learning Gaussian-Bernoulli RBMs using Difference of Convex Functions Optimization", IEEE Transactions on Neural Networks and Learning Systems, vol. 33, No. 10, 2022, pp. 1-24.

Vaswani et al., "Attention is All You Need", arXiv preprint arXiv:1706.03762, 2017, 15 Pgs.

Yi et al., "ST-MVL: Filling Missing Values in Geo-Sensory Time Series Data", Proceedings of the Twenty-Fifth International Joint Conference on Artificial Intelligence, 2016, pp. 2704-2710.

Yu et al., "Assessment and adjustment of approximate inference algorithms using the law of total variance", arXiv preprint arXiv:1911.08725, Nov. 2019 [online], [retrieved on Jan. 31, 2022], 30 pgs.

\* cited by examiner

SYSTEMS AND METHODS FOR TRAINING GENERATIVE MODELS USING SUMMARY STATISTICS AND OTHER CONSTRAINTS

CROSS-REFERENCE TO RELATED APPLICATIONS

The current application claims the benefit of and priority under 35 U.S.C. § 119(e) to U.S. Provisional Patent Application No. 62/923,337 entitled "System and Methods for Training Generative Models Using Summary Statistics and Other Constraints" filed Oct. 18, 2019. The disclosure of U.S. Provisional Patent Application No. 62/923,337 is hereby incorporated by reference in its entirety for all purposes.

FIELD OF THE INVENTION

The present invention generally relates to training generative models using summary statistics and, more specifically, to training or adapting generative models so that data generated by the model satisfy specified, population-level summary statistics.

BACKGROUND

Generative models have various applications in a variety of fields, such as economic forecasting, climate modeling, and medical research. Generative models are a class of machine learning model that learn to sample from a, potentially multivariate and/or time-dependent, probability distribution that is consistent with the observed data. Traditionally, generative models are trained using observations from the data distribution. However, one frequently obtains other information in the form of population level summary statistics or other constraints. It can often be difficult to train or adjust generative models to incorporate such summary statistics.

SUMMARY OF THE INVENTION

Systems and methods for training and utilizing constrained generative models in accordance with embodiments of the invention are illustrated. One embodiment includes a method for training a constrained generative model. The method includes steps for receiving a set of data samples from a first distribution, identifying a set of constraints from a second distribution, and training a generative model based on the set of data samples and the set of constraints.

In a further embodiment, the set of constraints includes a set of tolerances for the constraints, wherein training the generative model includes training the generative model until a difference between each constraint of the set of constraints falls within a corresponding tolerance of the set of tolerances.

In still another embodiment, each constraint of the set of constraints is weighted to adjust for the relative importance of each constraint.

In a still further embodiment, training the generative model comprises training a first model on the set of data samples, and perturbing the first model using the set of constraints to result in the trained generative model.

In yet another embodiment, perturbing the first model includes minimizing a loss function that balances the set of constraints with a difference between the first generative model and the perturbed model.

In a yet further embodiment, training the generative model includes training a model using the set of data samples and a loss function that incorporates the set of constraints as a penalty term.

In another additional embodiment, the set of constraints includes a set of functionals that map probability densities to real numbers, wherein training the generative model includes enforcing that the set of functionals attain particular values.

In a further additional embodiment, the set of constraints includes at least one composite constraint, wherein the at least one composite constraint is a function of several variables.

In another embodiment again, the generative model is at least one of the group consisting of a recurrent neural network, a restricted Boltzmann machine, a generative adversarial network, and a variational autoencoder.

In a further embodiment again, the generative model is a Boltzmann machine, wherein training the generative model comprises training the generative model on the set of data samples, updating the generative model to add a set of new hidden units and connections to the generative model, and training the generative model based on the set of constraints.

In still yet another embodiment, training the generative model based on the set of constraints includes only modifying weights for the set of new hidden units.

In a still yet further embodiment, training the generative model comprises training a surrogate model to score generative models as a function of weights of the generative models, and training the generative model based on the data samples, the set of constraints, and the surrogate model.

In still another additional embodiment, the method further includes steps for generating, using the trained generative model, a set of samples based on the second distribution.

In a still further additional embodiment, the set of data samples are from a clinical trial of a treatment for a first population segment and the set of constraints includes a set of summary statistics of a different second population segment, wherein the generated set of samples predict the effects of the treatment for the second population segment.

One embodiment includes a non-transitory machine readable medium containing processor instructions for training a constrained generative model, where execution of the instructions by a processor causes the processor to perform a process that comprises receiving a set of data samples from a first distribution, identifying a set of constraints from a second distribution, and training a generative model based on the set of data samples and the set of constraints.

One embodiment includes a method for generating samples from a target distribution. The method includes steps for receiving a set of data samples from a first distribution, identifying a set of constraints from a target distribution, training a generative model based on the set of data samples and the set of constraints by training a first model on the set of data samples, and perturbing the first model to minimize a loss function that balances the set of constraints with a difference between the first model and the perturbed model to result in the trained generative model, and generating, using the trained generative model, a set of samples based on the target distribution.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
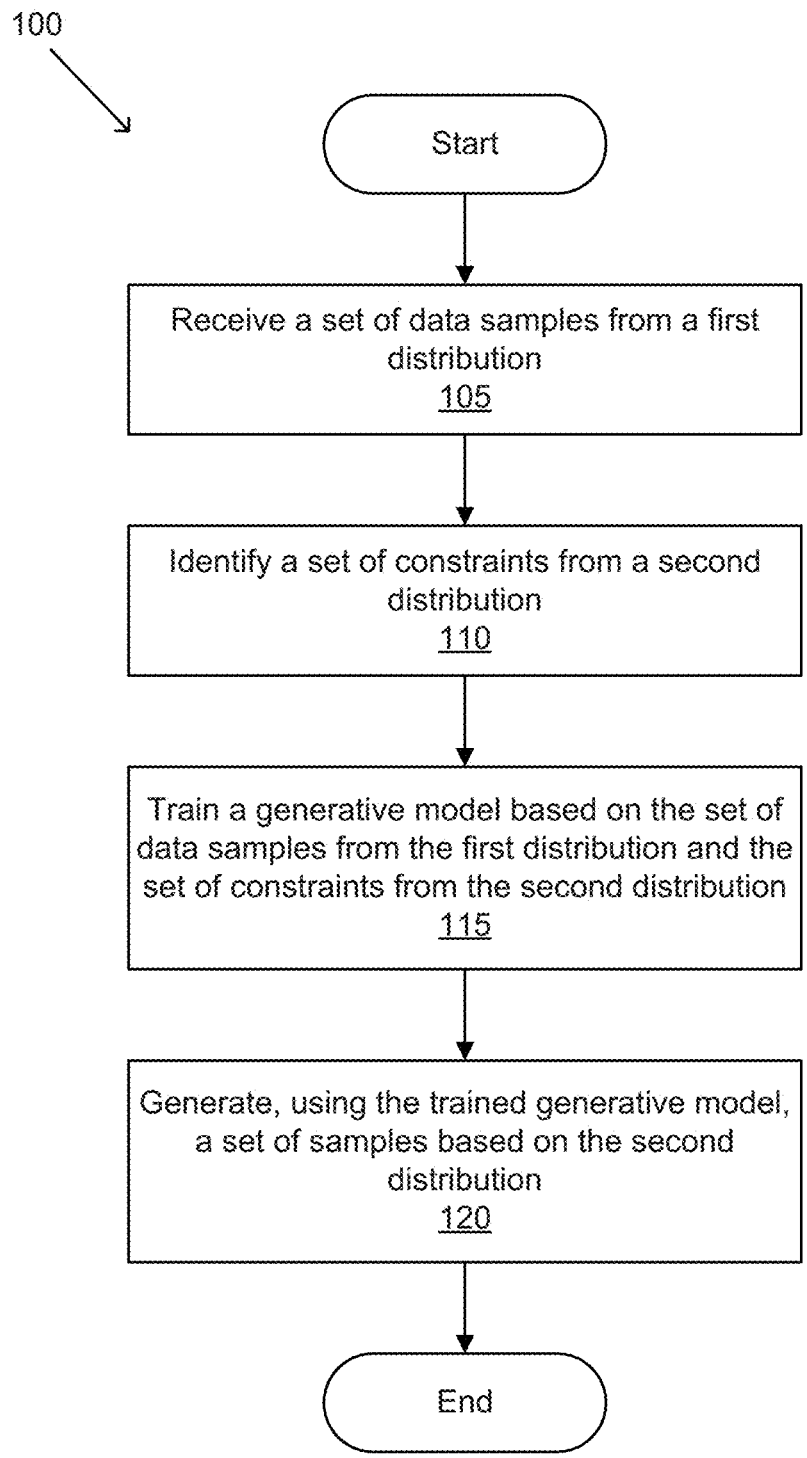
FIG. 1 conceptually illustrates a process for utilizing and/or training constrained generative models in accordance with an embodiment of the invention.

Generative models including Generative Adversarial Networks (GANs), Variational Auto-encoders (VAEs), Normalizing Flows (NFs), and Boltzmann Machines, among others, are models that can be used in machine learning that learn to draw samples from an unknown probability distribution. Generative models are a class of machine learning model that learn to sample from a, potentially multivariate and/or time-dependent, probability distribution that is consistent with the observed data. Typically, these models are trained directly on samples from the distribution. However, one can often obtain additional information in the form of population level constraints from summary statistics or other sources. There are applications in a number of different commercial areas such as economic forecasting, climate modeling, and medical research.

Systems and methods in accordance with certain embodiments of the invention can provide a generative model that can satisfy additional constraints to within prescribed tolerances. In various embodiments, generative models can be pre-trained using observation level data (an "existing model"). Existing models can be perturbed according to a gradient descent procedure, minimizing a loss function that balances the failure to meet the constraints with a distributional distance between the existing model and the perturbed one. In many embodiments, generative models can be assumed to be an "energy-based model." Processes in accordance with a variety of embodiments of the invention can apply a method of Lagrange multipliers in order to derive a perturbation of the model's energy function that minimizes a loss function. In some embodiments, processes can train generative models from observation level data while incorporating exogenous constraints simultaneously.

Systems and methods in accordance with some embodiments of the invention can be used for the analysis of patient data in the context of clinical research studies. In a variety of embodiments, subject-level data obtained from historical clinical trials and patient registries can be used to train a generative model able to create synthetic patient data. However, there are often additional published data in the form of summary statistics from other clinical trials, for which the individual subject-level data are unavailable. These types of published summary statistics often form the basis of many meta-analyses in medicine. Incorporating knowledge from these summary statistics into a generative model in accordance with various embodiments of the invention can improve the model by providing information on other populations. For example, one possible application in accordance with certain embodiments of the invention would be to train a generative model on subject-level data from an adult population with a particular disease, and then to refine that model for a pediatric population using published summary statistics.

In numerous embodiments, it can be useful to generate data that conform to some constraints on population-level statistics to within prescribed error tolerances. For example, it can be desirable to generate data for which the first and second moments are close to some specified values. Systems and methods in accordance with various embodiments of the invention can take different general approaches to this problem. In certain embodiments, an existing model can be evolved towards a model that satisfies the constraints. In several embodiments, constraints can be directly incorporated into the training process; in this way a new model can be trained from the original training data so that it satisfies the constraints.

Systems and methods in accordance with certain embodiments of the invention can allow for the efficient training of models using constraints, such as (but not limited to) summary statistics to result in generative models that can accurately generate samples similar to a new population based on a model trained on a different population. In some embodiments, this can allow for the creation of models where there may be insufficient actual data (e.g., for a limited or vulnerable population) to conventionally train a generative model.

Constrained Generative Models

Constrained generative models in accordance with numerous embodiments of the invention can be used to generate samples from a target distribution. In various embodiments, constrained generative models can be generated from an initial model trained on a different initial distribution, where the initial model can be updated (or perturbed) based on constraints (e.g., summary statistics) from the target distribution.

A process for utilizing and/or training constrained generative models in accordance with an embodiment of the invention is illustrated in FIG. 1. Process 100 can receive (105) a set of data samples from a first distribution. Data samples from a distribution in accordance with a variety of embodiments of the invention can include (but are not limited to) patient data from clinical studies, population segments, etc.

Process 100 can identify (110) a set of constraints from a second target population. Constraints in accordance with some embodiments of the invention can include summary statistics, such as (but not limited to) averages, medians, modes, etc. In a number of embodiments, constraints can include an initial condition and one or more subsequent conditions. Constraints in accordance with several embodiments of the invention can include a set of functionals that map probability densities to real numbers, where training the generative model includes enforcing that the set of functionals attain particular values. In numerous embodiments, constraints can include at least one composite constraint, where the constraint is a function of multiple variables. The multiple variables can include measurements for a single covariate at multiple points in time and/or multiple measurements taken at a single point in time. Composite constraints in accordance with a number of embodiments of the invention can include a stochastic function. In various embodiments, the constraint for each element (or covariate) of a data sample can be weighted differently to adjust for the relative importance of the covariate.

In some embodiments, constraints can include tolerances, where a constrained generative model can be trained such that the generated results fall within the tolerances. Processes in accordance with a variety of embodiments of the invention can incorporate constraints directly into the training process for the constrained generative model. In several embodiments, constraints can be incorporated into a training process by utilizing a loss function with a penalty term, where the tolerances include penalty weights for each constraint. Alternatively, or conjunctively, processes in accordance with numerous embodiments of the invention can perturb a pre-trained model until the constraints fall within the set tolerances.

Process 100 can train (115) a generative model based on the set of data samples from the first population and the set of constraints from the target distribution. Generative models in accordance with a variety of embodiments of the invention can include various different models, such as (but not limited to) restricted Boltzmann machines (RBMs), recurrent neural networks (RNNs), conditional Boltzmann machines (CBMs), generative adversarial networks (GANs), variational autoencoders (VAEs), etc. In many embodiments, generative model can take as input a sequence of measurements for one or more covariates at multiple points in time.

In a variety of embodiments, training a generative model can be performed by training a first model on a set of data samples from a first distribution (e.g., a clinical trial) and then perturbing the first model using constraints (e.g., summary statistics) from a target distribution. This can allow the perturbed model to use data from the first distribution to generate samples for a target distribution. Perturbing the model in accordance with certain embodiments of the invention can include minimizing a loss function that balances the constraints with a difference between the first generative model and the perturbed model. In various embodiments, determining a difference between different models can be performed by sampling from both generative models.

In a variety of embodiments, the generative model may be an RBM, where perturbing the model can include adding new hidden variables and connections to the first model. The generative model in accordance with some such embodiments of the invention can freeze the original hidden variables, so that the original hidden variables are trained on the data samples and only the new hidden variables are updated based on the constraints.

Processes in accordance with a variety of embodiments of the invention can train constrained generative models using adversarial training. In some embodiments, a surrogate model can be trained as a function of weights of a first model, where the surrogate model can be used to train the constrained generative model to implement constraints. Surrogate models in accordance with some embodiments of the invention can be trained by training multiple generative models (e.g., conditional RBMs), scoring each model, and training the surrogate to predict the score as a function of the weights of each model.

Process 100 can generate (120), using the trained generative model, a set of samples based on the target distribution. In a number of embodiments, generating samples can include inferring a set of unknown characteristics for data samples of a target distribution. Unknown characteristics in accordance with a variety of embodiments of the invention can include (but are not limited to) predicted future measurements for a covariate of a data sample and/or other missing data for a data sample.

While specific processes for utilizing and/or training constrained generative models are described above and throughout this description, any of a variety of processes can be utilized to utilize and/or train constrained generative models as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to clinical trials, the techniques disclosed herein may be used in various applications, including (but not limited to) economic forecasting and/or climate modeling.

Definitions

A data point indexed by i is described by vector $x_i(t)$ of covariates $x_{ij}(t)$ at time t. Generative models in accordance with numerous embodiments of the invention can be any probabilistic model for the joint distribution of these, i.e. $p(x(0), \ldots, x(t))$. Such models could include (but are not limited to) traditional statistical models, recurrent neural networks, Restricted Boltzmann Machines (RBMs), GANs, VAEs, and/or other types of generative models. In many cases, the time index may be omitted, simply using $x = \{x(0), \ldots, x(t)\}$ to refer to data that may, or may not, be time dependent. In some embodiments, generative models can be parametric; that is, each model can be determined by a finite collection of numerical parameters. If $\theta$ are the parameters of the model $p(x)$, this can be written as $p(x; \theta)$, or may be omitted for convenience and simplicity.

Energy-Based Models

Energy-based models can capture dependencies in covariates by utilizing an auxiliary scalar function called the energy $\mathcal{H}(x,y)$ that measures the compatibility of a given configuration of covariates y with a response x. Using this energy function, many queries can be recast in the following form: given some observed x, obtain a response y that is the most compatible (i.e., has the lowest energy). That is, $$y = \operatorname*{argmin}_{y'} \mathcal{H}(x, y')$$

This is called inference. As an example, in a clinical setting, y may represent all observable characteristics of a patient in a clinical trial with x being a subset of these that have been measured at baseline. The above query corresponds to questions like, "Given a subject's baseline characteristics, how will those characteristics evolve in time?", or "In a clinical record with missing data, what are likely values for missing covariates?". In a reinforcement learning scenario, y may represent a set of actions and x may represent a history of rewards. In this case, the query corresponds to the question, "Which action should an agent choose to maximize reward under constraints?".

Though energies may be defined in a variety of ways, typically a suitably-flexible class of energy functions $H=\{\mathcal{H}(\cdot,\cdot)\}$ is chosen. Learning in this paradigm then corresponds to choosing an appropriate energy function from this class by evaluating a loss functional $\mathcal{L}[\mathcal{H}]$ that selects energy functions that consistently assign low energies to "correct" configurations and high energies to "wrong" ones. In the case that the family is parametric, $H=\mathcal{H}(\cdot,\cdot|\theta)$, learning corresponds to choosing an optimal setting of parameters $\theta$ that minimizes a loss function. In machine learning, this is typically done with gradient descent approaches.

A given energy-based model does not a priori have a probabilistic interpretation, which can be beneficial from a computational perspective when one is not needed. However, particularly in a clinical setting, it is critical that responses y are calibrated, i.e., the absolute probability of a given response y is known. For these purposes, an energy-based model may be interpreted as a probability distribution through the Gibbs distribution, $$p(y|x) = Z^{-1} \exp(-\mathcal{H}(x, y))$$

$$Z \triangleq \int_y \exp(-\mathcal{H}(x, y))$$

with Z called the partition function by analogy with statistical physics. This restricts the class of possible energy functions that may be chosen so that the integral in Z converges. In many cases, this partition function cannot be computed exactly, and sampling methods can be used to approximate it. In a similar vein, Markov Chain Monte Carlo (MCMC) can be used to generate samples from this model.

In a similar way, any probabilistic model can be interpreted into an energy-based model by defining the energy as $$\mathcal{H}(y,x) = -\log p(y|x).$$

In a number of embodiments, this model may then be trained using alternative learning procedures, and include other loss terms.

In the typical case where the energy function is normalizable and parametric, the learning problem can be made particularly efficient by noting that the gradient with respect to some parameter $\phi$ of any finite, differentiable expectation $\mathcal{F}[p]=E_p[f(x, y)]$ may be computed as follows, $$\nabla_\phi \mathcal{F}[p] = \nabla_\phi E_p[f(x, y)] \quad (1)$$

$$= E_p[\nabla_\phi f(x, y)] + \int dy f(x, y) \nabla_\phi p(y|x)$$

$$= E_p[\nabla_\phi f(x, y)] + \int dy f(x, y) \left[\frac{\nabla_\phi p(y|x)}{p(y|x)}\right] p(y|x)$$

$$= E_p[\nabla_\phi f(x, y)] + E_p[f(x, y) \nabla_\phi \log p(y|x)]$$

$$= E_p[\nabla_\phi f(x, y)] + Cov_p[f(x, y), -\nabla_\phi \mathcal{H}(x, y)]$$

Here, $f$ is some differentiable vector-valued function of (x, y) that may be dependent on $\phi$. This estimator is known as REINFORCE in reinforcement learning literature and the "log-derivative trick" in machine learning. Many loss functionals reduce to expectations of this form.

Restricted Boltzmann Machines

Figure 2:
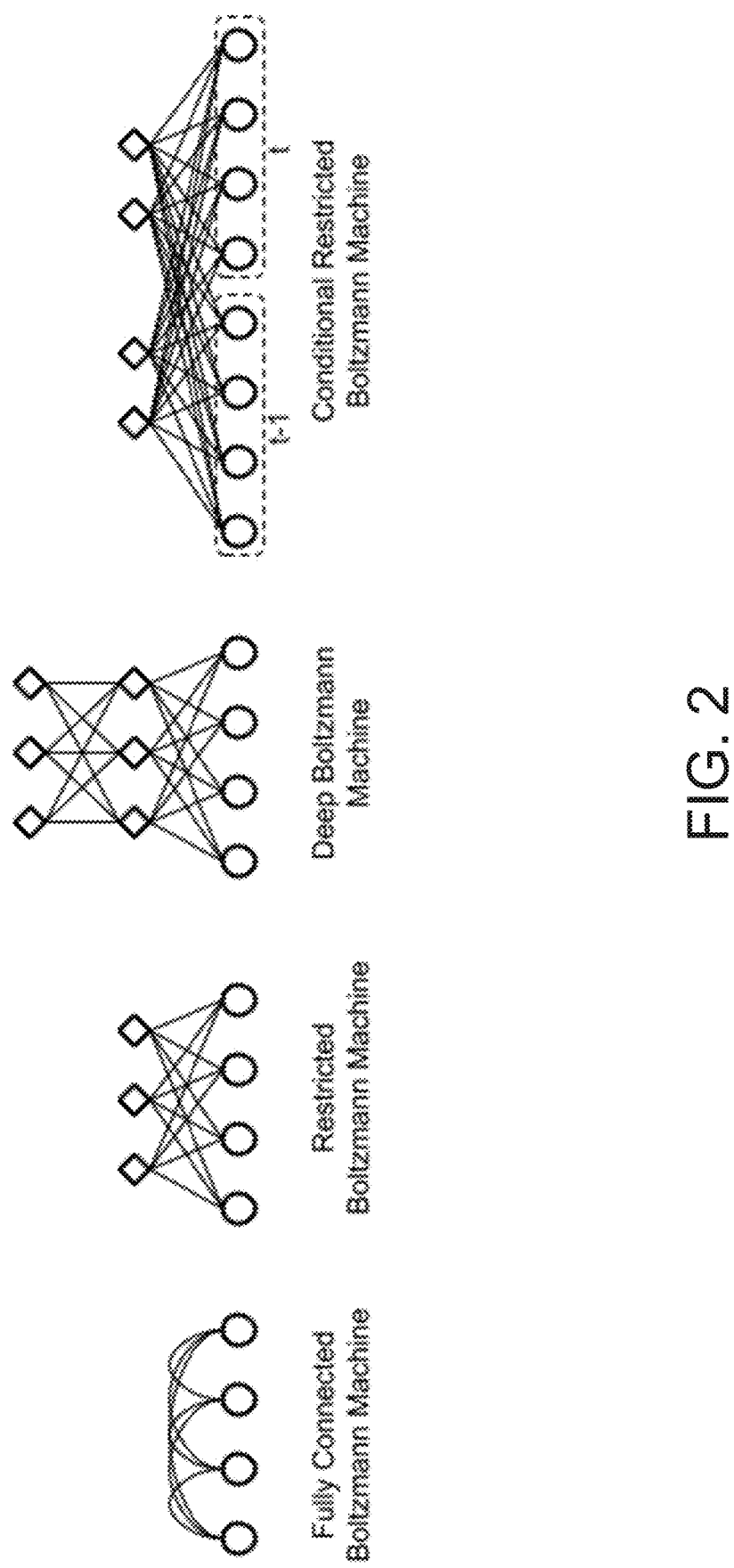
FIG. 2 illustrates schematic architectures of different types of Boltzmann machines.

Processes in accordance with various embodiments of the invention can be applied to parametric generative models, such as those mentioned in the previous section. However, processes in accordance with some embodiments of the invention can apply these methods to the class of generative models known as RBMs and Conditional RBMs for time series. Schematic architectures of different types of Boltzmann machines are illustrated in FIG. 2. This figure illustrates fully connected Boltzmann machines, Restricted Boltzmann Machines (RBMs), Deep Boltzmann Machines (DBMs), and Conditional Restricted Boltzmann Machines (CRBMs).

An RBM is a type of energy-based generative model typically used for unsupervised learning, learning the distribution of responses p(y). The response is partitioned into two parts y:={v, h} called the visible and hidden units, respectively. The energy function typically takes a form $$\mathcal{H}(v, h) = -\sum_i a_i(v_i) - \sum_\mu b_\mu(h_\mu) - \sum_{i\mu} W_{i\mu} a_i'(v_i) b_\mu'(h_\mu), \quad (2)$$

in which $(a_i, a_i')$ and $(b_\mu, b_\mu')$ are pairs of functions that depend on the covariate types, and W is a matrix of parameters that couples the visible units v to the hidden units h. As hidden units are never observed, the data distribution is modeled as the marginal, $$p(v)=Z^{-1}\int dh \exp[-\mathcal{H}(v,h)].$$

Inference can be performed by sampling to avoid computing the normalization factor. Due to the special independence structure of an RBM, samples in accordance with numerous embodiments of the invention can be generated efficiently through block Gibbs sampling.

In several embodiments, learning can be performed by maximizing likelihood (or equivalently minimizing the KL divergence between model and data distributions) with stochastic gradient descent. In certain embodiments, sampling can be accelerated with persistent contrastive divergence.

It is possible to generalize the concept of an RBM to sequence models (such as time-series) by assuming that the process is Markovian. Under this assumption, the covariates can be divided into a pair $v=(v_{t+1}, v_t)$ describing a pair of neighboring timepoints. Then, in certain embodiments, a Conditional RBM (CRBM) can be defined using the energy function $$\mathcal{H}(v_{t+1}, v_t, h) = \mathcal{H}(v_{t+1}, h) + \mathcal{H}(v_t, h) + \sum_\mu b_\mu(h_\mu)$$

where each component energy is of the same form as the RBM energy above. The additional sum can be added to avoid "double-counting" the hidden-unit self energy. Reordering terms, the conditional energy function can be defined as $$\mathcal{H}(v_{t+1}, h | v_t) = \mathcal{H}(v_{t+1}, h) - \sum_{i\mu} W_{i\mu}^{(t)} a_i^{(t)}(v_{t,i}) b_\mu(h_\mu),$$

Here, the sum term defines the coupling between the visible units at time t to t+1 through the hidden units. The conditional distribution, computed as $p(v_{t+1}|v_t) \propto \int e^{-\mathcal{H}(v_{t+1}, h|v_t)} dv$, can define the transition kernel of the Markov process. One skilled in the art will recognize that such approaches can be generalized to include Markov processes with longer memory times.

Constraints

Let $\{\mathcal{F}_1, \mathcal{F}_2, \ldots, \mathcal{F}_{\mathcal{K}}\}$ be some finite collection of functionals mapping probability densities to real numbers. By enforcing that these functionals attain particular values, say 0, this collection may be interpreted in accordance with various embodiments of the invention as constraints on a probability density p(x), $$\{\mathcal{F}_1[p]=0, \ldots, \mathcal{F}_{\mathcal{K}}[p]=0\}.$$

In numerous embodiments, inequality or margin constraints can be realized, e.g., of the form $\mathcal{F}_i[p] \leq 0$.

There are a number of common ways that such a set of constraints could be realized. For example, let $\{f_1(x), f_2(x), \ldots, f_K(x)\}$ be some finite collection of functions of the covariates x, $\{m_1, m_2, \ldots, m_K\}$ a set of real numbers. Each function $f_i$ then corresponds to a statistic whose expected value can be computed over the distribution p and is constrained to match some moment parameter $m_i$, $$\mathcal{F}_i[p] := \delta(E_p[f_i], m_i) = \delta(\int f_i(x)p(x)dx, m_i) \quad (3)$$

by a distance metric $\delta(\bullet, \bullet)$, such as an $L_2$-distance, $$\delta_{L2}(x, y) := \frac{1}{2}\|x - y\|^2.$$

In a number of embodiments, other distances could just as easily be used, and the distance measure could be different for one or more constraints. For example, in certain embodiments, a positive weight parameter may be included for each distance to adjust the relative importance of the constraints. If p is defined by a parametric energy $\mathcal{H}(\bullet|\theta)$ then the derivative of $\mathcal{F}_i[p]$ can be computed with respect to $\theta$ using eq. (1), which for an $L_2$ distance would be $$\nabla_\theta \mathcal{F}_i[p] = E_p[f_i(x)\nabla_\theta \log p(x;\theta)] - m_i \quad (4)$$

Another constraint in accordance with some embodiments of the invention arises from specifying a marginal distribution for some covariate. For example, let $\{\psi_1(x), \psi_2(x), \ldots, \psi_K(x)\}$ be a finite collection of one-dimensional probability density functions. For each, define, $$\mathcal{F}_i[p] := \mathcal{D}[\mathcal{M}_i[p], \psi_i], \mathcal{M}_i[p](x_i) := \int p(x) \prod_{j \neq i} dx_j.$$

Here the integration is over all variables except i, $\mathcal{M}_i[p]$ is the marginal distribution of the covariate $x_i$ and $\mathcal{D}$ is a measure of divergence of 1-dimensional probability density functions (e.g., the Kullback-Leibler divergence). In certain embodiments, in addition to handling constraints on the distribution, constraints on parameters (e.g., a sparsity constraint on $\theta$) may be handled in the same framework.

In many embodiments, energy-based models can be trained using gradient descent and the constraints may be incorporated by augmenting the original loss function with penalty terms, $$\mathcal{L}[p] = \mathcal{H}(x|\theta) + \sum_i \lambda_i \mathcal{F}_i[p]$$

where $\lambda_i$ are positive penalty weights, representing a measure of tolerance to which a given constraint is satisfied. In many embodiments, during training, $\lambda$ can be progressively increased, corresponding to higher tolerance.

Composite Variables

Composite constraints in accordance with various embodiments of the invention can be a function of many variables, $$y(t) := f(x(0), \ldots, x(t)).$$

In many embodiments, composite constraints could include stochastic functions, $$y(t) \sim q(x(0), \ldots, x(t))$$

in which q( . . . ) is a family of probability distributions parametrized by the possible values of the covariates $\{x(0), \ldots, x(t)\}$.

In several embodiments, functions of a composite constraint can incorporate only covariates at the given time point, $$y(t) := f(x(t)).$$

An example could be a case in which a composite variable is a linear combination of some covariates. For instance, in Alzheimers disease, the ADAScog-11 score is a linear combination of eleven scores designed to test various components of cognitive function. Given a model for which $\{x_i(t): i \in \{1, \ldots, 11\}\}$ represents these scores, then the composite variable can be of the form, $$y(t) := \sum_{i=1}^{11} x_i(t).$$

Another example of a composite endpoint in accordance with some embodiments of the invention can count the number of occurrences of a particular event during some time period. Let $x_0(t)$ be a binary indicator variable indicating whether or not an event occurred between the time points t−1 and t. Let d be the number of years in the time period. Then the composite function can be an average over the duration, $$y(\tau) = \frac{1}{d}\sum_{t=0}^{\tau} x_0(t).$$

Another common scenario involves survival statistics. Suppose that the previous example is tweaked so that the composite function of interest is the presence or absence of an event during the time period. In this case, $$y(\tau) := \mathcal{I}(x_0(0) = x_0(1) = \cdots = x_0(\tau) = 0),$$

in which $\mathcal{I}$ denotes the indicator function.

The Perturbation Problem

Figure 3:
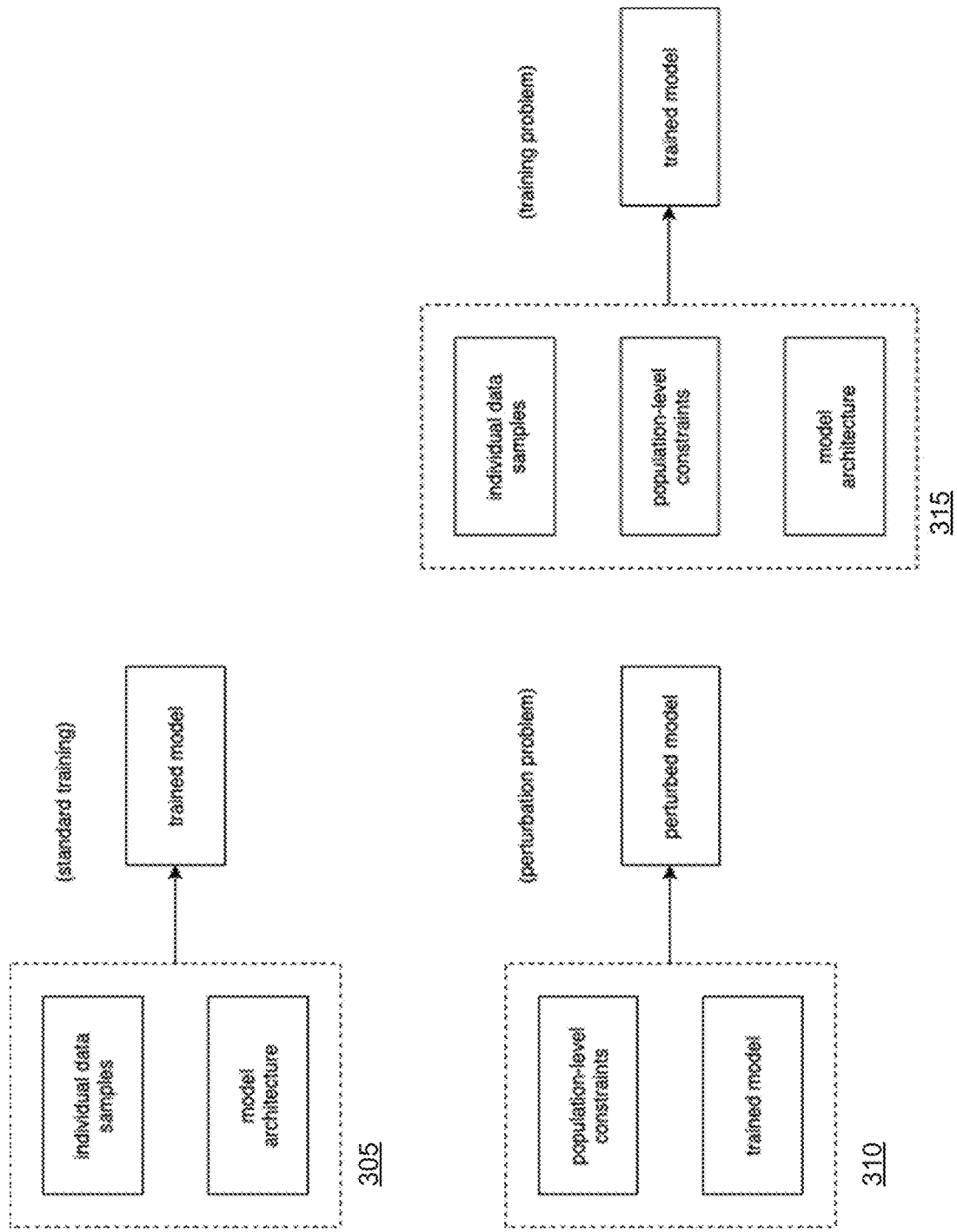
FIG. 3 illustrates example diagrams of generative model training in accordance with many embodiments of the invention.

Example diagrams of generative model training in accordance with many embodiments of the invention are illustrated in FIG. 3. The first diagram 305 illustrates a traditional approach to training a generative model that uses samples from the data distribution to the model to generate new samples that are similar (in some quantitative sense) to those obtained from the data distribution.

In some embodiments, generative models can be perturbed to incorporate constraints during model fitting. Consider the following general "perturbation problem". Regard p(x) as a distribution modeled by some given generative model. Assume some collection of K constraints, $\{\mathcal{F}_1=0, \mathcal{F}_2=0, \ldots, \mathcal{F}_\mathcal{K}=0\}$, as those discussed above. Processes in accordance with a variety of embodiments of the invention can identify a model q(x) which satisfies the family of constraints $\{\mathcal{F}_i[q]=0\}$ to within prescribed tolerances while simultaneously being as close as possible to p(x). Closeness to p(x) can be measured in a variety of ways in accordance with various embodiments of the invention. Processes in accordance with various embodiments of the invention can utilize a process of incremental perturbations of an original model to achieve the final model which satisfies the constraints. The distributions $\{p_0(x), p_1(x), \ldots,\}$ can be indexed to denote the discrete steps of these perturbations, identifying the given initial distribution with $p_0$.

Referring back to FIG. 3, diagrams 310 and 315 illustrate two means of incorporating population level constraints (such as summary statistics) into model fitting in accordance with a number of embodiments of the invention. In diagram 310, constraints can be applied to a pre-trained generative model to produce a new generative model that generates samples so as to satisfy the constraints, while retaining as much information as possible from the original data used to train the model. In diagram 315, a new model can be trained from scratch incorporating both individual data samples and population-level constraints.

Gradient Descent

In certain embodiments, a loss functional for a parametric model $q(x; \theta)$ can be defined $$\mathcal{L}[q] := \alpha \mathcal{D}[q, p_0] + (1-\alpha) \sum_{i=1}^{K} \delta_i(\mathcal{F}_i[q], m_i).$$

Here $\mathcal{D}[\cdot,\cdot]$ is a measure of divergence between two distributions, such as (but not limited to) Kullback-Leibler divergence, Wasserstein metric, Jensen-Shannon divergence, etc. Likewise, $\delta_i(\cdot,\cdot)$ is a measure of distance between real numbers, such as the $L_2$-metric or $L_1$-metric. Such losses can measure a convex combination of the divergence between q and $p_0$ as well as the error in satisfying the constraints. The mixing coefficient $\alpha$ can control the balance between minimizing the divergence and the constraints. In numerous embodiments, individual constraints may be individually weighted to account for different error tolerances. For example, if $\Delta m_i$ is the error tolerance for satisfying constraint i, then $$\delta_i(\mathcal{F}_i[q], m_i) = \frac{1}{2}\left(\frac{\mathcal{F}_i[q] - m_i}{\Delta m_i}\right)^2$$

is one example of a distance function.

The goal can be to minimize this loss function on the space of models. In some embodiments, the minimization can be carried out using stochastic gradient descent. In a number of embodiments, the gradient of the loss with respect to the parameters $\theta$ of $q(x; \theta)$ can take the form, $$\nabla_\theta \mathcal{L}[q] = \alpha \nabla_\theta \mathcal{D}[q, p_0] + (1-\alpha) \sum_i \partial_1 \delta_i(\mathcal{F}_i[q], m_i) \nabla_\theta \mathcal{F}_i[q].$$

In several embodiments, $\mathcal{D}$ can be the Kullback-Leibler divergence:

$$\mathcal{D}_{\mathcal{KL}}[p_0 \| q] := \int p_0(x) \log\left(\frac{p_0(x)}{q(x)}\right) dx,$$

And $\delta$ can be the squared $L_2$-metric, $$\delta(x_1, x_2) := \frac{1}{2}(x_1 - x_2)^2.$$

In this case, the gradient of the loss with respect to the parameters $\theta$ of $q(x; \theta)$ takes the form, $$\nabla_\theta \mathcal{L}[q] = \alpha \nabla_\theta \mathcal{D}_{\mathcal{KL}}[p_0 \| q] + (1-\alpha) \sum_i (\mathcal{F}_i[q] - m_i) \nabla_\theta \mathcal{F}_i[q].$$

The derivative of the distributional term expands as follows:

$$\begin{aligned}
\nabla_\theta \mathcal{D}_{\mathcal{KL}}[p_0 \| q] &= \nabla_\theta \int p_0(x) \log(p_0(x)) dx - \\
&\quad \nabla_\theta \int p_0(x) \log(q(x)) dx \\
&= -\int p_0(x) \nabla_\theta \log(q(x)) dx \\
&= E_{p_0}[-\nabla_\theta \log(q(x))].
\end{aligned}$$

Putting this together, $$\nabla_\theta \mathcal{L}[q] = \alpha E_{p_0}[-\nabla_\theta \log(q(x))] + (1-\alpha) \sum_i (\mathcal{F}_i[q] - m_i) E_q[f_i(x) \nabla_\theta \log(q(x))]$$

In the case that q is an energy based model with energy function $\mathcal{H}(x)$ that is parameterized by $\theta$, then this can be written more explicitly as $$\nabla_\theta \mathcal{L}[q] = \alpha\left(E_{p_0}[-\nabla_\theta \mathcal{H}(x)] - E_q[\nabla_\theta \mathcal{H}(x)]\right) + (1-\alpha) \sum_i (\mathcal{F}_i[q] - m_i) Cov_q[f_i(x), -\nabla_\theta \mathcal{H}(x)].$$

In certain embodiments, this gradient can be computed using Monte Carlo samples from $p_0$ and q.

Alternatively, if $\mathcal{D}[q, p_0] = \mathcal{D}_{\mathcal{KL}}[q \| p_0]$, $$\begin{aligned}
\nabla_\theta \mathcal{D}[q, p_0] &= \nabla_\theta \int q(x) \log(q(x)) dx - \nabla_\theta \int q(x) \log(p_0(x)) dx \\
&= \int (\nabla_\theta q(x)) \log(q(x)) dx + \\
&\quad \int \nabla_\theta q(x) dx - \int \nabla_\theta q(x) \log(p_0(x)) dx \\
&= \int q(x)(\nabla_\theta \log(q(x))) \log(q(x)) dx + \\
&\quad 0 - \int q(x) \nabla_\theta \log(q(x)) \log(p_0(x)) dx \\
&= E_q[(\log(q(x)) - \log(p_0(x))) \nabla_\theta \log(q(x))]
\end{aligned}$$

-continued $$= E_q\left[\log\left(\frac{q(x)}{p_0(x)}\right)\nabla_\theta \log(q(x))\right].$$

In general, it can be more difficult to compute the gradient for this latter choice of divergence. In a number of embodiments, gradient formulas can often be approximated with various methods dependent on the type of generative model employed.

Gradient descent according to this loss can be implemented in a number of ways. In the most straight-forward embodiment, stochastic gradient descent, or a similar gradient based optimizer, can be applied according to this loss (for some choice of a) until the process converges. In this case, the limiting model will not satisfy the constraints exactly—perhaps unless α=0. Setting a can be equivalent to selecting a tolerance for the failure of the constraints to be satisfied.

Figure 4:
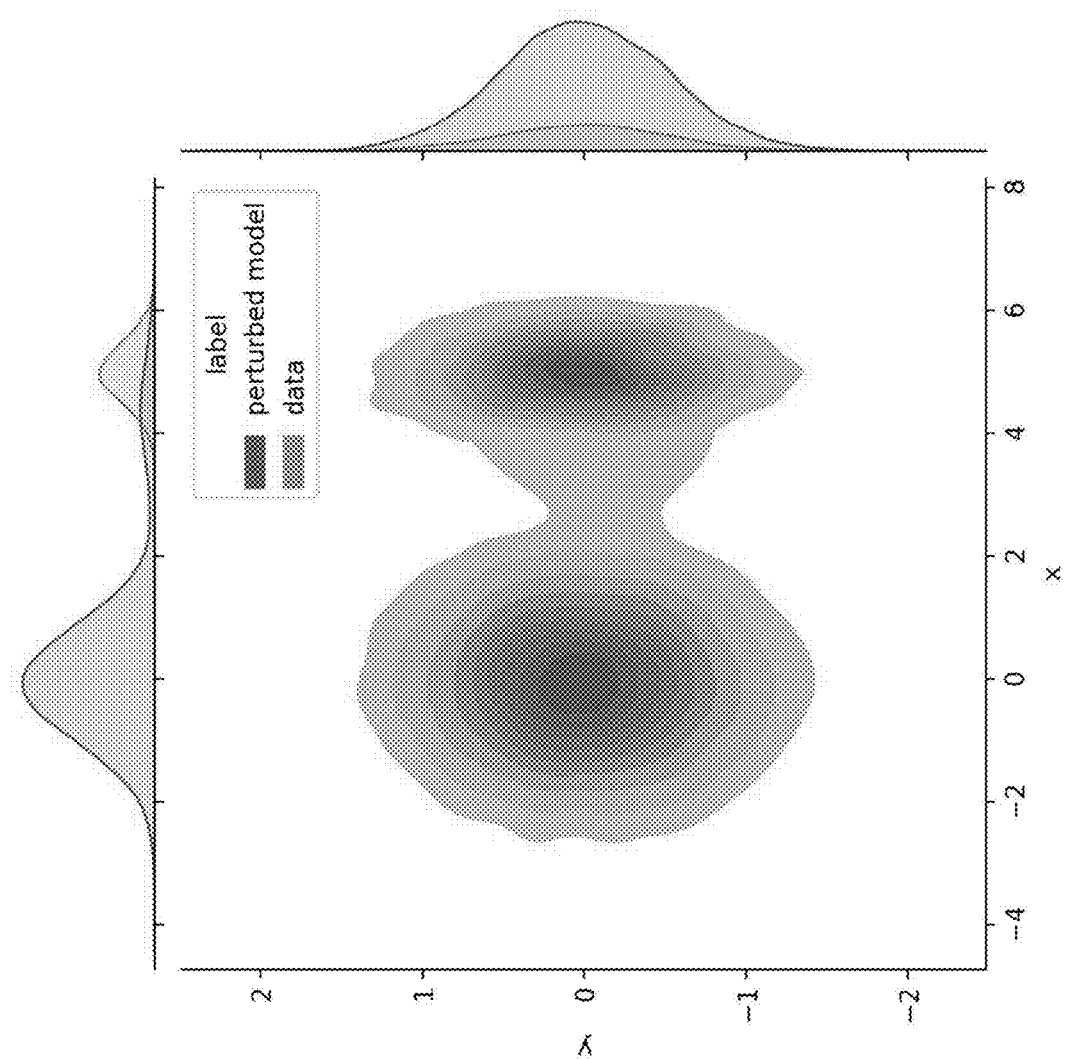
FIG. 4 illustrates an example of the perturbation problem in accordance with various embodiments of the invention.

An example of the perturbation problem is illustrated in FIG. 4. Here, an RBM consisting of two visible Gaussian units representing a 2D point and 25 hidden Bernoulli units is trained on data sampled from a 2D Multivariate Normal distribution. The figure shows the result of training this model under a constraint of a mean shifted to 0 and a variance of 1.

Some model types (e.g., RBM-type models) can possess a latent parametrization. As described above, an RBM possesses "hidden" units which are marginalized out to define the distribution p(v). In numerous embodiments, one strategy to perturb a model can be to augment the architecture of a pre-trained model by adding hidden variables and connections between them and the visible units. In this setting, if q(x) is an augmentation of $p_0(x; \theta)$, then the parameters of q(x) can be written as a pair $(\theta, \theta')$, split into those that are already parameters of $p_0(x)$ and those that are new. In several embodiments, gradient descent procedures can be run in which distributions $q(x; \theta, \theta')$ are constrained so that only the new parameters $\theta'$ vary. This approach can provide a certain rigidity to the perturbation problem defined by the model class and the degree of augmentation.

Energy-Based Model Perturbation

In a number of embodiments, it is assumed that the probability distribution p(x) takes a special form, $$p(x) = \frac{e^{-\mathcal{H}(x)}}{Z}, Z = \int_x e^{-\mathcal{H}(x)} dx,$$

for some specified function $\mathcal{H}(x)$ called the energy function. Such a distribution is called a Boltzmann distribution. Generative models of this type may be referred to as energy-based models. An RBM is one example of an energy based model.

As in the previous section, assume there are some constraint functionals paired with target values, ($\mathcal{F}=\{\mathcal{F}_i\}$, $m=\{m_i\}$) and that these constraints are of the form defined in (3) in which the $\mathcal{F}_i$ are defined by integrating functions $f(x)=\{f_i(x)\}$. Using these constraints, specify a Lagrangian, $$\mathcal{L}_{[q]} := \mathcal{D}_{[q,p_0]} + \lambda^T(m - \mathcal{F}_{[q]}) + \gamma(1 - \int q(x) dx),$$

which incorporates Lagrange multipliers $\lambda_i$ for each constraint and γ to enforce the constraint that q is a normalized density. As previously, the divergence $\mathcal{D}(\cdot,\cdot)$ can vary in various embodiments of the invention.

If $\mathcal{D}[q,p_0] = \mathcal{D}_{\mathcal{KL}}[q\|p_0]$, the following derivation can be achieved. Taking the functional derivative of $\mathcal{L}$ with respect to q and setting it equal to zero yields, $$0 = \frac{\delta \mathcal{L}}{\delta q} \Rightarrow (\log q(x) + 1 - \log p_0(x)) - \lambda^T f(x) - \gamma = 0.$$

Solving for q and applying the constraint that q be a probability density implies, $$q(x) = \frac{Z(0)}{Z(\lambda)} p_0(x) e^{\lambda^T f(x)}, Z(\lambda) = \int p_0(x) e^{\lambda^T f(x)} dx.$$

The dual optimization constraint can provide an extremal condition fixing the Lagrange multipliers λ, $$\lambda^* = \underset{\lambda}{\operatorname{argmax}}\left[-\log Z(\lambda) + \lambda^T m\right].$$

Therefore, the solution can take the form of a Boltzmann distribution in which the Lagrange multipliers regulate perturbations to the energy function of $p_0$, $$q(x) = \frac{1}{Z(\lambda^*)} e^{-\mathcal{H}(x) + \Sigma_i \lambda_i^* f_i(x)}, Z(\lambda^*) = \int e^{-\mathcal{H}(x) + \Sigma_i \lambda_i^* f_i(x)} dx. \quad (5)$$

For example, suppose that $p_0$ is an RBM and that there is an additional moment constraint $f_i(x) = x_i$. The model solving the constrained optimization problem can be an RBM in which the energy function is perturbed via, $$a_i(x_i) \leftarrow a_i(x_i) + \lambda_i^* x_i.$$

Alternatively, if $\mathcal{D}[q,p_0] = \mathcal{D}_{\mathcal{KL}}[p_0\|q]$, $$0 = \frac{\delta \mathcal{L}}{\delta q} \Rightarrow -\frac{p_0}{q} - \sum_i \lambda_i f_i(x) - \gamma = 0.$$

Solving for q yields, $$q(x) = -\frac{p_0}{\Sigma_i \lambda_i f_i(x) + \gamma},$$

which makes it clear that solutions are only possible under the condition that, $$\sum_i \lambda_i f_i < -\gamma \ \forall \ x.$$

The ability to satisfy this inequality depends on the form of the $f_i$ and is clearly not satisfiable, for instance, when the $f_i$ are affine functions of the covariates.

Working from (5), the perturbed distribution can be regarded as parametrized by the Lagrange multipliers, q(x;λ). The constraints can take the form, $$\{E_q[f_i] = m\} \Rightarrow \{\partial_{\lambda_i} \log(Z) = m_i\}.$$

This series of simultaneous equations can be solved according to a few different approaches in accordance with various embodiments. In a number of embodiments, an approximation to log(Z) can be found using a mean field, or variational approximation, such as (but not limited to) the Thouless-Anderson-Palmer (TAP) approximation. In several embodiments, gradient descents can be applied to the constraint terms, $$\nabla_\lambda \left[ \sum_i \frac{1}{2} (E_q[f_i] - m_i)^2 \right].$$

The notation can be vectorized so that $f := (f_1, \ldots, f_K)$, $m := (m_1, \ldots, m_K)$, $\lambda := (\lambda_1, \ldots, \lambda_K)$. Then the gradient to be descended can take the form, $$\nabla_\lambda \frac{1}{2} \|E_q[f] - m\|^2 (E_q[f] - m)^T Cov_q[f, f]$$

Linearization of the Lagrange Multiplier Problem

In (5) the solution to a Lagrange multiplier problem was established, $$q(x) = \frac{1}{Z(\lambda^*)} e^{-H(x) + \lambda^{*T} f(x)}, \quad Z(\lambda^*) = \int e^{-H(x) + \lambda^{*T} f(x)} dx,$$

with, $$\lambda^* = \arg\max_\lambda \left[ -\log(Z(\lambda)) + \lambda^T m \right].$$

The solution minimizes the KL-divergence between $q(x)$ and $p_0(x)$ subject to the constraints $\{E_q[f] = m\}$.

Consider now the one-parameter family of moments interpolating between the initial moments and the desired moments, $$m(\alpha) := \alpha m + (1-\alpha) E_{p_0}[f].$$

This family can generate the family of constraints, $$E_q[f] = \int (x) q(x) dx = m(\alpha),$$

which can then generate a one-parameter family of solutions, $$p_\alpha(x) = \frac{1}{Z(\lambda^*(\alpha))} p_0(x) e^{\lambda^*(\alpha)^T f(x)}, \quad Z(\lambda^*(\alpha)) = \int p_0(x) e^{\lambda^*(\alpha)^T f(x)} dx,$$

that starts at the initial distribution $p_0(x)$ and extends to $p_1(x) = q(x)$ continuously. The notation $\lambda(\alpha)$ emphasizes how $\lambda$ relies on $\alpha$, $$\lambda^*(\alpha) = \arg\max_\lambda \left[ -\log(Z(\lambda)) + \lambda^T m(\alpha) \right].$$

Similarly, these correspond to a one-parameter family of energy functions, $\mathcal{H}_\alpha(x) = \mathcal{H}(x) - \lambda^*(\alpha)^T f$.

In numerous embodiments, the linearization of the Lagrange multiplier problem can be computed on the energy functions, differentiating the solution family $\mathcal{H}_\alpha(x)$ at $\alpha = 0$:

$$\left. \frac{d\mathcal{H}_\alpha(x)}{d\alpha} \right|_0 = -\left. \frac{d\lambda^{*T}}{d\alpha} \right|_0 f.$$

So the task becomes to estimate, $$\left. \frac{d\lambda^*}{d\alpha} \right|_0.$$

Recall that $\lambda^*$ solves $$\frac{d}{d\lambda} \left[ -\log(Z(\lambda)) + \lambda^T m(\alpha) \right] = 0$$

The left hand side is $$\frac{d}{d\lambda} \left[ -\log(Z(\lambda)) + \lambda^T m(\alpha) \right] = m(\alpha) E_{p_\lambda} - [f], \quad (6)$$

whereby $p_\lambda(x)$ denotes the distribution $$\frac{1}{Z(\lambda)} e^{-H(x) + \lambda^T f}.$$

The expectation $E_{p_\lambda}[f]$ can be estimated with Monte Carlo techniques in accordance with a variety of embodiments of the invention.

These calculations provide the elements for processes in accordance with some embodiments of the invention as described below.

Perturbing a Model Using the Linearization of the Lagrange Multiplier Problem

In a number of embodiments, the solution of the constrained optimization problem defined by the Lagrange Multiplier problem (5) can be regarded to be intractable to solve in one step. Instead, processes in accordance with various embodiments of the invention can attempt to solve the original problem by chaining together a number of small perturbations, each of which solves a Lagrange multiplier problem whose constraint specifies a much smaller perturbation. This can be achieved in accordance with a number of embodiments of the invention by obtaining the formulas describing the linearization of the Lagrange multiplier problem above.

An example of a process for perturbing a model in accordance with a variety of embodiments of the invention is described below. This example starts with a distribution $p_0(x)$ and a desired moment constraint as above $E_q[f] = m$. Select some small grid of values of $\alpha$ near 0. At minimum, select $a_{-1} = -\epsilon < 0 < \alpha_1 = \epsilon$ for some $\epsilon$. Estimate $\lambda^*(\alpha_i)$ for each of the $\alpha$ by stochastic gradient ascent on (6). These yield two estimates $\hat{\lambda}^*(\alpha_{-1})$ and $\hat{\lambda}^*(\alpha_1)$ of $\lambda^*(\alpha_{-1})$ and $\lambda^*(\alpha_1)$ respectively. Their difference provides a simple estimate of the derivative of $\lambda^*$ at 0, $$\left. \frac{d\lambda^*}{d\alpha} \right|_0 \approx \frac{1}{2\epsilon} \left( \hat{\lambda}^*(\alpha_1) - \hat{\lambda}^*(\alpha_{-1}) \right).$$

Select a learning rate, l, and apply the update, $$\mathcal{H}(x) \mapsto \mathcal{H}(x) - l \cdot \frac{1}{2\epsilon} \left( \hat{\lambda}^*(\alpha_1) - \hat{\lambda}^*(\alpha_{-1}) \right)^T f.$$

Finally, set $p_0(x)$ to be the pmf corresponding to this new perturbed energy function. These steps can be repeated for as many iterations as is sufficient for the process to converge to a solution.

Applications for Model Perturbations Using Summary Statistics

CRBMs can describe the transition operator of a Markov chain $\{x(0), \ldots, x(\tau)\}$. In various embodiments, it can be desirable to place constraints on some equilibrium, or long timescale, statistics of this Markov chain. For some constraint function $f_i(x(\tau), \ldots, x(0))$, the gradient is $$\nabla_\theta \mathcal{F}_i[q] = \nabla_\theta E_q[f_i(x(\tau), \ldots, x(0))] =$$

$$\int f_i(x(\tau), \ldots, x(0)) \left[ \nabla_\theta \log q(x(0)) + \sum_{t=1}^{T} \nabla_\theta \log q(x(t) | x(t-1)) \right]$$

$$\prod_{t=1}^{\tau} q(x(t) | x(t-1)) \prod_{t=0}^{\tau} dx(t).$$

While this is computable in principle, in practice the computation of this gradient can be quite complex. In a variety of embodiments, different approaches can be taken to surmount this problem depending on the extent to which the constraint functions incorporate several time points, or span a narrow or wide time range relative to the model's lag.

One common scenario concerns the use of a generative model to analyze the results of a clinical trial for which the control subjects' baseline and endpoint data are only described in terms of population means and standard deviations for each covariate. Constraint functions in accordance with several embodiments of the invention can pertain to covariates at single timepoints, $x(0)$, and $x(\tau)$. We assume that the model's lag is small relative to the number of time points $\tau$. Any trajectory generated by the model may represent a component of a trajectory starting at time 0 or ending at time $\tau$ or something in between. In order to provide a means of a CRBM generating trajectories that are marked as either initial, final, or neither, processes in accordance with a number of embodiments of the invention can introduce two static, indicator variables to the CRBM which indicate that a trajectory generated by the model is initial (starting at absolute timepoint 0) or final (ending at the last timepoint). These additional covariates can become part of the original model trained with data augmented with these indicators. Then the process of perturbing a CRBM to satisfy statistics on the baseline or final covariates can include running SGD minimization, noting that that penalty term only contributes to the loss for sampled particles which are initial or final.

In another common scenario, generative models can be in the form of a lag-1 CRBM that defines a joint distribution $p_0(x(t),x(t+1))$ after integration over the hidden units, with constraint functions $f_i(x(t),x(t+1))$ such that the constraints can be determined by averaging over neighboring timepoints. For example, one constraint could be the average rate of change of some variable $$\Delta x_i = \int (x_i(t+1) - x_i(t)) q(x(t), x(t+1)) dx(t) dx(t+1).$$

In such a case, perturbation methods in accordance with various embodiments of the invention can be applied because the constraint is on a function of the visible units of the CRBM.

However, in the general setting in which the constraint functions incorporate all of the covariates across the full time range, more principled approaches may be considered. Such approaches can involve making simplifying assumptions. In a variety of embodiments, a simplifying approach can convert a long timescale constraint into a short timescale constraint. For example, a common constraint function is a total change of some covariate, i.e., $f_i(x(\tau), \ldots, x(0)) = x_i(\tau) - x_1(0)$, with target value m. This can be converted into a constraint $f_1(x(t), x(t+1))$ on the transitions with value $m_i/\tau$ if a linear change over time in the variable of interest is assumed. This approach can introduce linear-change assumptions but enables perturbation methods in accordance with a variety of embodiments of the invention to be applied.

Another simplifying approach involves fitting an RBM, $\tilde{p}(x(0), x(\tau))$, using samples from the model, $p(x(0), \ldots, x(\tau))$, defined by the original CRBM. Then, any constraint of the form $f_i(x(\tau), x(0))$ can be a standard constraint for which perturbation methods in accordance with many embodiments of the invention can be directly applied. This approach does not enable one to compute any functions that depend on all of the timepoints in the original Markov chain.

An adversarial approach can be utilized in accordance with several embodiments of the invention. A surrogate model can be learned, where the model is a function of CRBM weights rather than samples generated by the CRBM itself. In numerous embodiments, to train this surrogate model, a training sweep may be run to generate multiple CRBM models and score them according to some procedure. The surrogate model can then be trained to predict the score as a function of model weight, and/or conditionally on the dataset. In a variety of embodiments, trained surrogate models can then be used to implement a constraint in training further CRBM models that biases the learning procedure to select models that have a high score. In this way, a variety of complicated constraints may be implemented, including those that rely on composite variables that cannot be generated directly from a single CRBM model.

The Training Problem

Training Incorporating Summary Data

The problem of applying exogenous statistical constraints to a previously trained generative model have been discussed. In several embodiments, statistical constraints can be incorporated into the training of the generative model from the start. This setup can be regarded as a version of the perturbation framework above except that the pre-trained model to perturb is in fact the unknown model describing the data distribution. More concretely, the training loss function in accordance with a number of embodiments of the invention can be $$\mathcal{L}[p] := \alpha L[p; X] + (1-\alpha) \sum_{i=1}^{K} \delta_i(\mathcal{F}_i[p], m_i),$$

in which $L[p;X]$ is the usual loss function for the generative model that depends on data X, such as (but not limited to) a log-likelihood loss, variational bound on the log-likelihood, an estimated statistical distance between the data and model distributions, and/or an adversarial loss. In some embodiments, the gradient of the loss can consist of a convex combination of the usual gradient for the respective generative model, and the gradient defined in (4).

In many embodiments, this functional can be minimized using stochastic gradient descent starting at a model with randomly-seeded parameters. The training can then proceed from a random model towards a model that balances nearness to the (unknown) data distribution with the minimization of the moment penalty.

Figure 5:
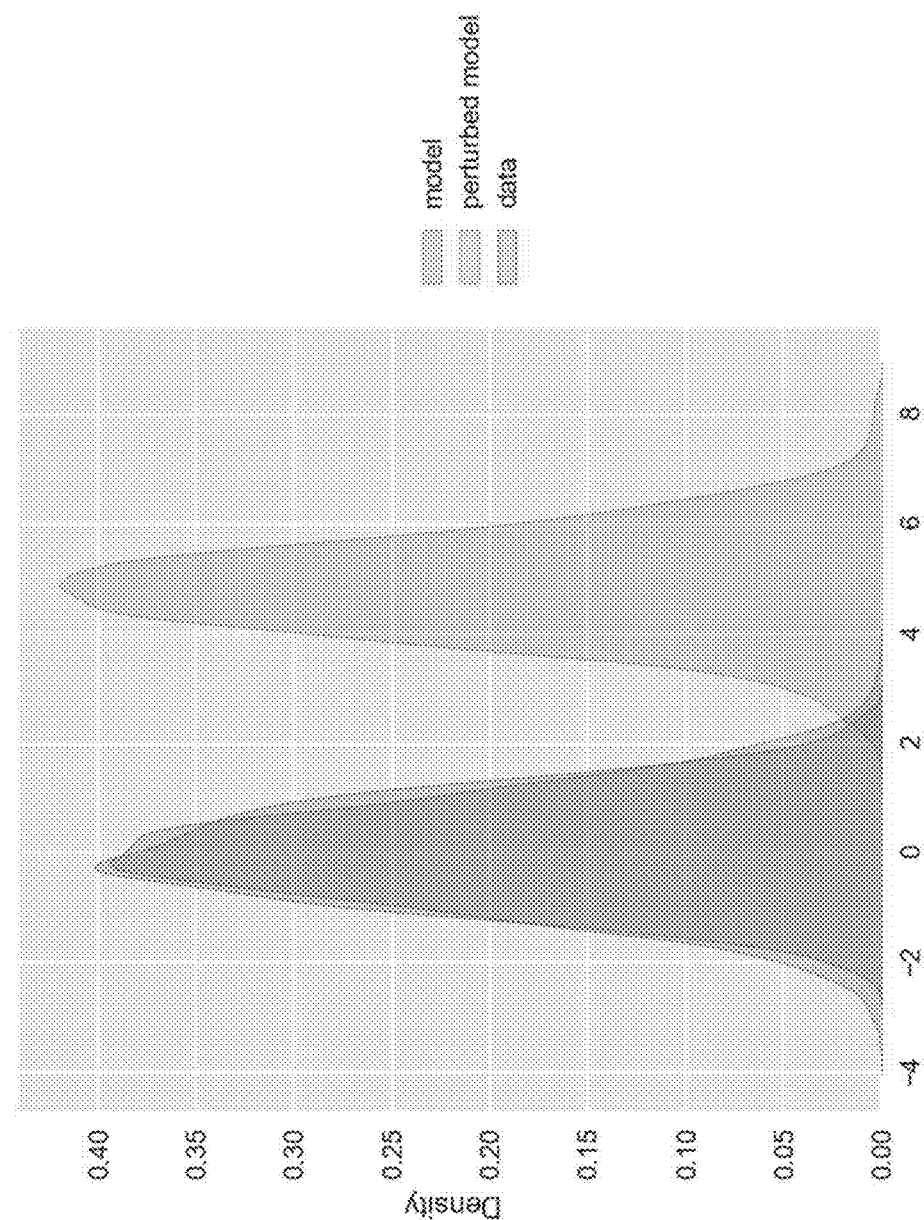
FIG. 5 illustrates a demonstration of an embodiment of the training problem for a continuous covariate.

A demonstration of an embodiment of the training problem for a continuous covariate is illustrated in FIG. 5. Here, an RBM consisting of one visible Gaussian unit and two hidden Bernoulli units is trained on data sampled from a 1D Standard Normal distribution. The histogram above shows the result of training this model under a constraint of a mean 5 and variance 1.

Incorporating Summary Data into CRBM Training

Perturbing a trained CRBM so that certain properties of its equilibrium or long-time behavior match or approximate some specified values is described above. A critical complication in that case relates to the fact that the CRBM may model the distribution of covariates only indirectly by providing an explicit parametrization of the joint distribution of covariates along a short segment of time-progression. In several embodiments, the full distribution over all time can be sampled by iterated conditional sampling from the CRBM to generate a Markov chain. As a result, a number of different approaches can be made to circumvent this difficulty depending on the complexity of the constraints. In so far as the training problem is really a special case of the perturbation approach, all such approaches apply to the problem of training CRBMs while simultaneously incorporating constraint penalties.

Applications Involving Training Incorporating Composite Statistics

In a variety of embodiments, statistical constraints concerning composite variables can be incorporated into model training. Assume a generative model $p(x(0), \ldots, x(\tau))$ of some covariates x across some number of time points. Processes in accordance with certain embodiments of the invention can consider different versions of a composite variable $$y(\tau):=f(x(0), \ldots, x(\tau)).$$

Consider the scenario in which $f$ is an affine function of the covariates at the final time point, $$y := y(\tau) = \sum_i f_i x_i(\tau) + f_0,$$

in which the $f_i$ are some real-valued coefficients. Processes in accordance with many embodiments of the invention can apply summary statistics concerning y in training. For example, assume a constraint that the first and second moments of y under the model distribution are m, and a respectively. In this case, $$E_m[y] = E_m\left[\sum_i f_i x_i(\tau) + f_0\right] = \sum_i f_i E_m[x_i(\tau)] + f_0.$$

Therefore, the constraint to be imposed takes the form, $$m = \sum_i f_i E_m[x_i(\tau)] + f_0.$$

In many embodiments, pushing a model towards this constraint during training can be performed by appending a term to the loss which measures the deviation from the desired value. In this case, $$\mathcal{L}_c = \alpha \delta\left(\sum_i f_i E_m[x_i(\tau)] + f_0 m\right)$$

can be added to the total loss in training. Here α is a tunable weight and δ a measure of distance between two quantities. As described in previous sections, when δ is the squared error, the gradients of this loss term can be estimable by the same means they are estimated in the total loss. In certain embodiments, a similar addendum can be applied to the total loss to incorporate a second order moment, where similar methods can be used to estimate its gradients.

For another example of a composite constraint, consider a constraint based on the number of occurrences of some event during a given time period. Assume a generative model that contains a binary variable $x_0(t)$ denoting whether an event occurred between time points t−1 and t. Let d be the number duration of the time period. Then the composite variable can be an average, $$y(\tau) = \frac{1}{d}\sum_{t=0}^{\tau} x_0(t).$$

Now $y(\tau)$ follows a potentially complicated distribution, even if the model is a lag-n CRBM. However, in certain embodiments, a simplifying assumption can be made about the model distribution in order to more easily incorporate this constraint.

Assume that the values of $x_0(t)$ are dependent only on baseline covariates according to some statistical model, for example, $$p(x_0(t)|x(0) \ldots x(t-1)) = p(x_0(t)|x(0)) = \text{expit}[\beta(x(0))t + \alpha(x(0)) + \in],$$

in which $\in$ is 0-centered Gaussian noise, and β and α are functions of the baseline covariates. These coefficients can be defined in terms of some relatively simple expectations with respect to the mode $$\alpha(x(0)) = \text{logit} E_m[x_0(0)|x(0)],$$

$$\beta(x(0)) = \text{logit} E_m[x_0(n)|x(0)] - \text{logit} E_m[x(0)|x(0)].$$

In many embodiments, these conditional expectations and their derivatives are estimable for CRBMs and, hence, allow one to make an addendum to the total training loss as in the previous example. Note that because the simplifying assumption implies that the rate of change of $x_0$ is dependent only on the baseline covariates, the loss term (and its gradients) in accordance with a number of embodiments of the invention can be evaluated along length-n covariate trajectories in the same way that the CRBM loss is.

In numerous embodiments, processes can be applied to survival statistics. Suppose that the previous example is modified so that the composite variable of interest is the presence or absence of an event during the time period. In this case, $$y(\tau): \mathcal{D}(x_0(0) = x_0(1) = \cdots = x_0(\tau) = 0),$$

in which $\mathcal{D}$ denotes the indicator function. Again, a simplifying assumption can be applied to estimate $y(\tau)$ as a function of the baseline covariates. Namely, for the sake of the constraint loss, assume $$p(x_0(t)) = \beta(x(0)),$$

in which $\beta(x(0))$ is some function of the baseline covariates. This says that the starting covariates determine a time-independent event rate, β. Then the distribution of y comes from a Poisson distribution $$p(y(\tau)=1) = e^{-\tau\beta(x(0))}.$$

So given that $\beta(x(0))=E_m[x_0(0)|x(0)]$, a loss term measuring the failure of moments of y to match some prescribed values can be appended, and this loss can be incorporated into the training of the CRBM model.

Training in an Augmented Space

In numerous embodiments, training under constraints can be interpreted in two additional ways that span both the "training" and "perturbation" settings. In certain embodiments, the observations x remain unused and the model can be trained in an unsupervised manner. In a number of embodiments, two distributions of responses can be learned, $p(y|x, C=0)$ for which subject-level data is available, and $p(y|x, C=1)$ for which only summary statistics are available represented as a set of constraints $\{\mathcal{F}=0\}$. Naturally, the label C is arbitrary, and the approach generalizes to an arbitrary number of different datasets.

In various embodiments, a pre-trained generative model $p_0(y)$ is assumed equal to $p(y|C=0)$ and is interpreted as an EBM with the energy $\mathcal{H}(y_0|C=0) \triangleq \mathcal{H}_0(y) = -\log p_0(y_0)$. If the model is to be trained instead of perturbed, a suitable learning procedure in accordance with certain embodiments of the invention may be carried out on this objective as usual. In many embodiments, the model is an RBM and the conditional energy $\mathcal{H}_0$ follows (2). In the case C=1, the energy function can include additional terms, $$\mathcal{H}_{(y_0,y_1|C=1)} = \mathcal{H}_{(y_0|C=0)} + \mathcal{H}_{1(y_0,y_1)}$$

where the term $\mathcal{H}_1$ may share parameters with $\mathcal{H}(y_0|C=0)$ and include additional energy terms representing Bayesian priors. In a simple implementation assuming an RBM energy, define the original space $y=(v_0, h_0)$ as usual. Then one example of an augmented model is given by, $$\mathcal{H}(v_0, h_0, h_1 | C) = \mathcal{H}(v_0, h_0) + C\left(-b_\mu^{(1)}(h_\mu^{(1)}) - \sum_{i\mu} W_{i\mu}^{(1)} a_i^{(0)\prime}(v_i^{(0)}) b_\mu^{(1)\prime}(h_\mu^{(1)})\right),$$

effectively gluing additional hidden units to the original trained model. The learning procedure in accordance with certain embodiments of the invention can consist of training with an augmented loss using gradient descent, $$\mathcal{L}[p] = \mathcal{L}_0[p] + C\sum_i \lambda_i \mathcal{F}_i[p] \quad (7)$$

where $\mathcal{L}_0$ is the original loss functional used to train the model and $\mathcal{F}_i$ represents additional information available about $p(y|x, C=1)$. In particular embodiments, it may be appropriate to fix the parameters of the original model $\mathcal{H}_0$ and only adjust the parameters of $\mathcal{H}_1$. In that case, the augmented terms can be interpreted as parametrizing a shift of the original distribution. This approach can enable expanding the capabilities of the model in other ways, for example by adding new covariates to the model.

In some embodiments, a conditional energy function may be defined as a function of a set of parameters $m=\{m_1\}$, $\mathcal{H}(y_0|m)$. The energy in accordance with many embodiments of the invention can take the form similar to an RBM, $$\mathcal{H}(v_0, h_0 | m) =$$

$$\mathcal{H}(v_0, h_0) + \left(-\sum_{ij} W_{i\mu}^{(1)} a_i^{(0)\prime}(v_i^{(0)}) f_j(m) - \sum_{\mu k} W_{\mu j}^{(1)} b_\mu^{(0)\prime}(h_\mu^{(0)}) f_k(m)\right),$$

where the coupling functions $f$ can have an arbitrary parameteric dependence on m, for example consisting of a neural network or normalizing flow. The loss functional in accordance with a number of embodiments of the invention can be of the same form as above, including desired constraints (7) also parameterized by m.

When learning subject-level data $p(y|C=0)$, these parameters can be set to known statistics of the dataset, and so the constraints should be satisfied, or nearly so. If the model is pretrained, this step may be used to train the parametric dependence functions $f$. A parametric data augmentation procedure in accordance with many embodiments of the invention can be used to perturb the original data to match the statistics m. For example, in the case of continuous data this can be done by shifting a particular covariate by a fixed value. In this way, the model can learn a mapping between desired settings of constraints and values of parameters. In the case of more complicated moment constraints, the data augmentation strategy in accordance with a number of embodiments of the invention can be expressed as a generative adversarial network, with the RBM acting as a discriminator. Alternatively, in certain embodiments, the RBM model itself can be used to generate samples that are consistent with the constraints.

Systems for Utilizing and/or Training Constrained Generative Models

Constrained Generative Modeling System

Figure 6:
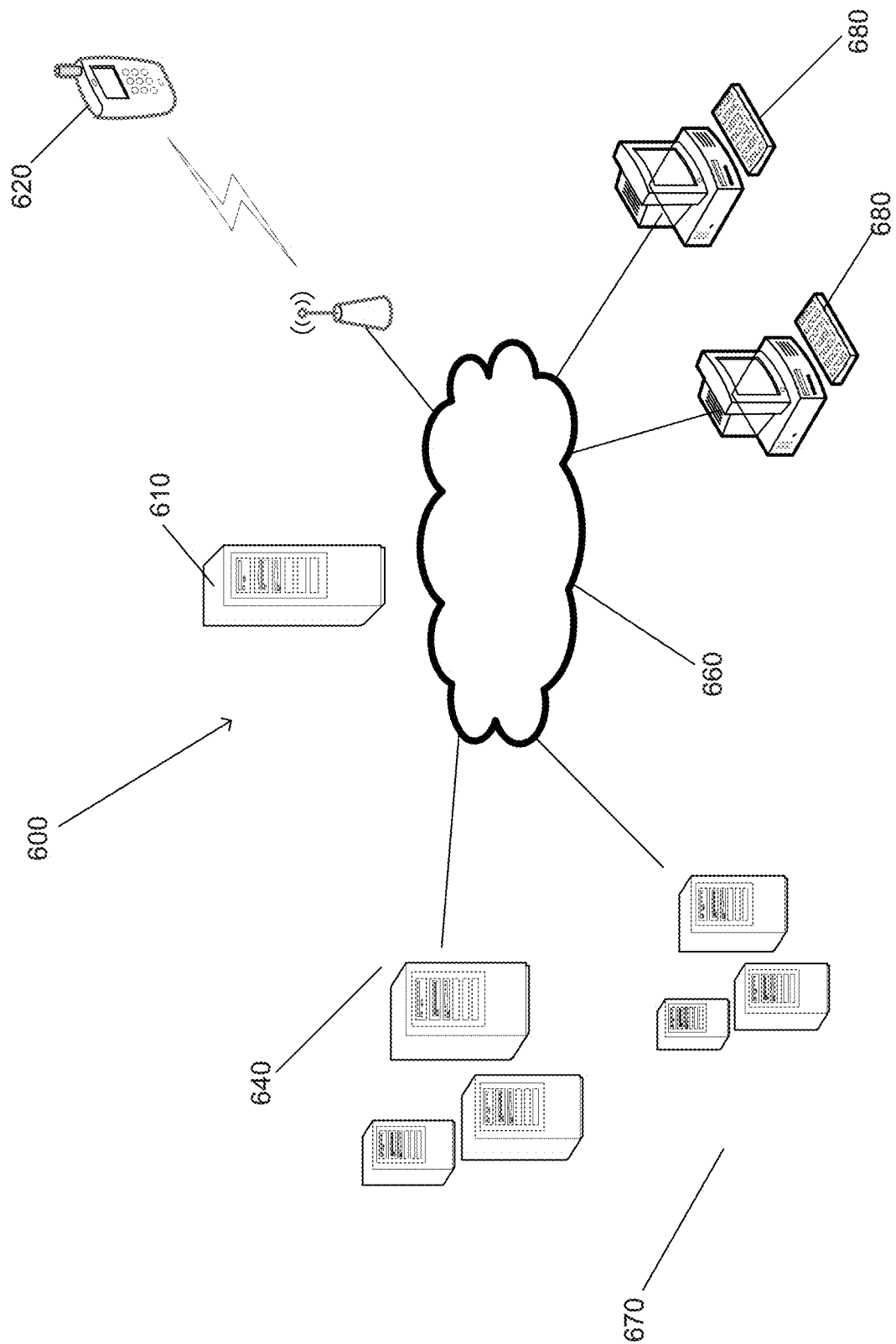
FIG. 6 illustrates an example of a constrained generative modeling system that can train and/or utilize constrained generative models in accordance with an embodiment of the invention.

An example of a constrained generative modeling system that can train and/or utilize constrained generative models in accordance with an embodiment of the invention is illustrated in FIG. 6. Network 600 includes a communications network 660. The communications network 660 is a network such as the Internet that allows devices connected to the network 660 to communicate with other connected devices. Server systems 610, 640, and 670 are connected to the network 660. Each of the server systems 610, 640, and 670 is a group of one or more servers communicatively connected to one another via internal networks that execute processes that provide cloud services to users over the network 660. One skilled in the art will recognize that a constrained generative modeling system may exclude certain components and/or include other components that are omitted for brevity without departing from this invention.

For purposes of this discussion, cloud services are one or more applications that are executed by one or more server systems to provide data and/or executable applications to devices over a network. The server systems 610, 640, and 670 are shown each having three servers in the internal network. However, the server systems 610, 640 and 670 may include any number of servers and any additional number of server systems may be connected to the network 660 to provide cloud services. In accordance with various embodiments of this invention, a constrained generative modeling system that uses systems and methods that utilize and/or train constrained generative models in accordance with an embodiment of the invention may be provided by a process being executed on a single server system and/or a group of server systems communicating over network 660.

Users may use personal devices 680 and 620 that connect to the network 660 to perform processes that utilize and/or train constrained generative models in accordance with various embodiments of the invention. In the shown embodiment, the personal devices 680 are shown as desktop computers that are connected via a conventional "wired" connection to the network 660. However, the personal device 680 may be a desktop computer, a laptop computer, a smart television, an entertainment gaming console, or any other device that connects to the network 660 via a "wired" connection. The mobile device 620 connects to network 660 using a wireless connection. A wireless connection is a connection that uses Radio Frequency (RF) signals, Infrared signals, or any other form of wireless signaling to connect to the network 660. In the example of this figure, the mobile device 620 is a mobile telephone. However, mobile device 620 may be a mobile phone, Personal Digital Assistant (PDA), a tablet, a smartphone, or any other type of device that connects to network 660 via wireless connection without departing from this invention.

As can readily be appreciated the specific computing system used to utilize and/or train constrained generative models is largely dependent upon the requirements of a given application and should not be considered as limited to any specific computing system(s) implementation.

Constrained Generative Modeling Element

Figure 7:
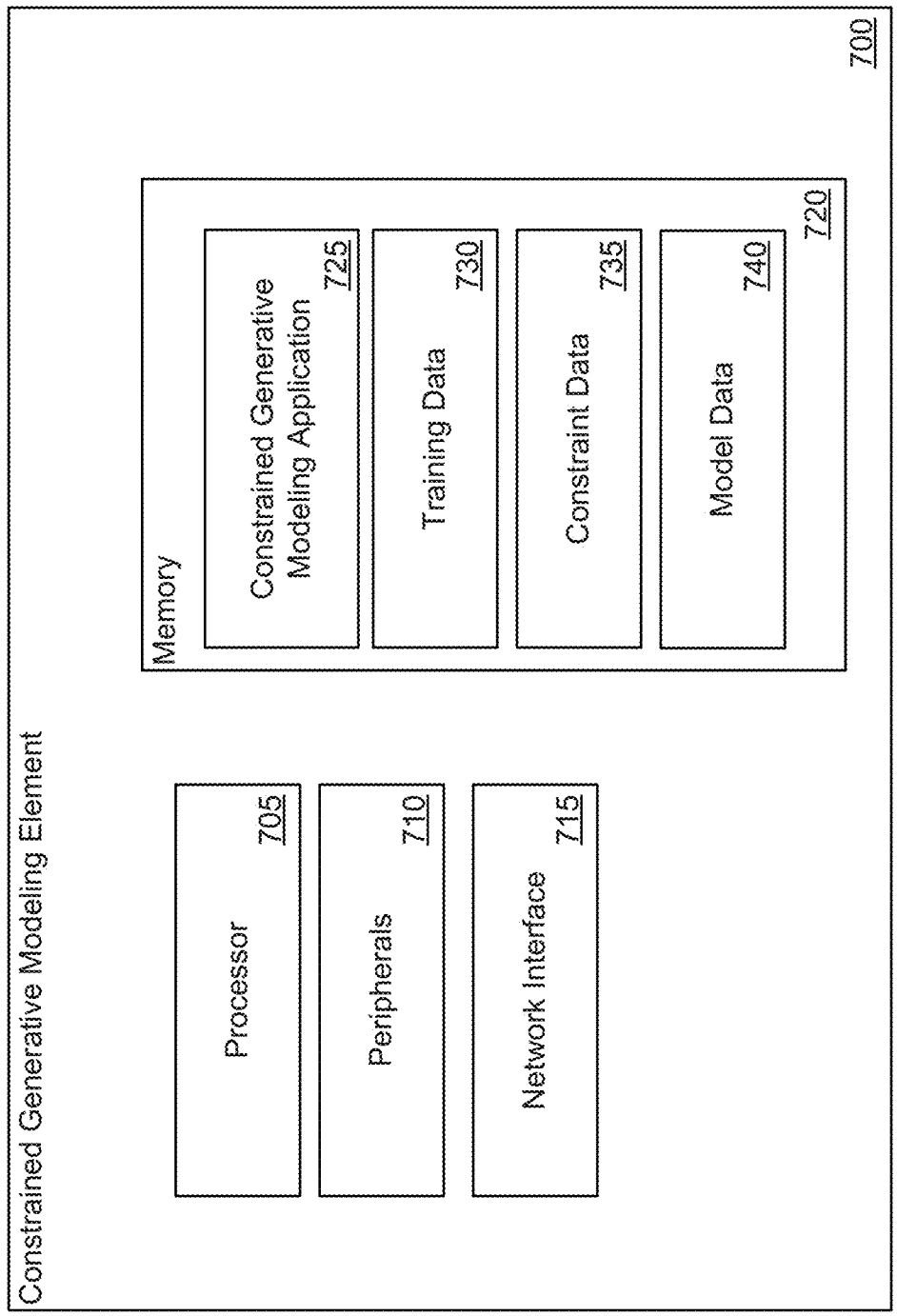
FIG. 7 illustrates an example of a constrained generative modeling element that executes instructions to perform processes that utilize and/or train constrained generative models in accordance with an embodiment of the invention.

An example of a constrained generative modeling element that executes instructions to perform processes that utilize and/or train constrained generative models in accordance with an embodiment of the invention is illustrated in FIG. 7. Constrained generative modeling elements in accordance with many embodiments of the invention can include (but are not limited to) one or more of mobile devices, cameras, and/or computers. Constrained generative modeling element 700 includes processor 705, peripherals 710, network interface 715, and memory 720. One skilled in the art will recognize that a constrained generative modeling element may exclude certain components and/or include other components that are omitted for brevity without departing from this invention.

The processor 705 can include (but is not limited to) a processor, microprocessor, controller, or a combination of processors, microprocessor, and/or controllers that performs instructions stored in the memory 720 to manipulate data stored in the memory. Processor instructions can configure the processor 705 to perform processes in accordance with certain embodiments of the invention.

Peripherals 710 can include any of a variety of components for capturing data, such as (but not limited to) cameras, displays, and/or sensors. In a variety of embodiments, peripherals can be used to gather inputs and/or provide outputs. Constrained generative modeling element 700 can utilize network interface 715 to transmit and receive data over a network based upon the instructions performed by processor 705. Peripherals and/or network interfaces in accordance with many embodiments of the invention can be used to gather inputs that can be used to utilize and/or train constrained generative models.

Memory 720 includes a constrained generative modeling application 725, training data 730, constraint data 735, and model data 740. Constrained generative modeling applications in accordance with several embodiments of the invention can be used to utilize and/or train constrained generative models as described herein.

Training data in accordance with a variety of embodiments of the invention can include various types of data that can be used to train constrained generative models. In certain embodiments, training data can include (but is not limited to) time-sequenced data, medical data, economic data, and/or weather data. Training data in accordance with a variety of embodiments of the invention can include data from clinical trials.

Constraint data in accordance with a number of embodiments of the invention can include constraints to be applied to constrained generative models. In many embodiments, constraint data can include summary statistics for a target distribution, where applying the constraints can result in a constrained generative model that can accurately generate samples from the target distribution based on information from the data samples of a different population. Constraints can take various forms, examples of which are included throughout this description.

In several embodiments, model data can store various parameters and/or weights for constrained generative models. Model data in accordance with many embodiments of the invention can be updated through training on training data captured on a constrained generative modeling element or can be trained remotely and updated at a constrained generative modeling element. In several embodiments, weights for generative models trained on training data from a first distribution can be perturbed based on constraint data from a target distribution.

Although a specific example of a constrained generative modeling element 700 is illustrated in this figure, any of a variety of constrained generative modeling elements can be utilized to perform processes for utilizing and/or training constrained generative models similar to those described herein as appropriate to the requirements of specific applications in accordance with embodiments of the invention.

Constrained Generative Modeling Application

Figure 8:
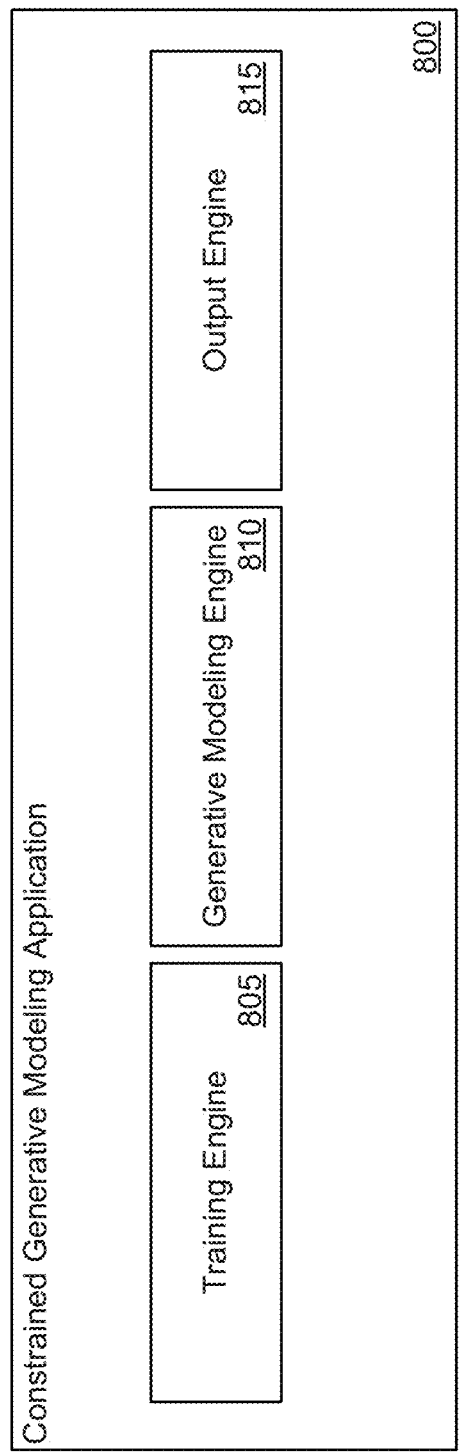
FIG. 8 illustrates an example of a constrained generative modeling application for utilizing and/or training constrained generative models in accordance with an embodiment of the invention.

An example of a constrained generative modeling application for utilizing and/or training constrained generative models in accordance with an embodiment of the invention is illustrated in FIG. 8. Constrained generative modeling application 800 includes training engine 805, generative modeling engine 810, and output engine 815. One skilled in the art will recognize that a constrained generative modeling application may exclude certain components and/or include other components that are omitted for brevity without departing from this invention.

Training engines in accordance with many embodiments of the invention can be used to train generative models based on a set of constraints. In some embodiments, training engines can train a model on training data from a first distribution before perturbing that model to generate samples based on constraints from a target distribution. Training engines in accordance with several embodiments of the invention can train a model based on both the training data and constraints in a single pass, where constraints can be applied through penalties applied to training loss functions.

In certain embodiments, generative modeling engines can be used to model a target distribution based on individual data from a different distribution and constraints or summary statistics of the target distribution. Generative modeling engines in accordance with a number of embodiments of the invention can include any of a variety of models, including (but not limited to) restricted Boltzmann machines (RBMs), recurrent neural networks (RNNs), conditional Boltzmann machines (CBMs), generative adversarial networks (GANs), variational autoencoders (VAEs), etc.

Output engines in accordance with several embodiments of the invention can provide a variety of outputs to a user, including (but not limited to) generated samples, analyses based on generated samples, notifications, alerts, and/or reports. In a variety of embodiments, analyses can include (but are not limited to) predicted effectiveness of a treatment on an untested population, predicted disease progressions, predicted economic indicators, weather predictions, etc.

Although a specific example of a constrained generative modeling application is illustrated in this figure, any of a variety of constrained generative modeling applications can be utilized to perform processes for utilizing and/or training constrained generative models similar to those described herein as appropriate to the requirements of specific applications in accordance with embodiments of the invention.

Although specific methods of constrained generative modeling are discussed above, many different methods of constrained generative modeling can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for training a constrained generative model, the method comprising:
receiving a set of data samples from a first distribution;
identifying a set of constraints from a second distribution; and
training a generative model based on the set of data samples and the set of constraints, wherein:
the generative model is a neural network comprising hidden units; and
training the generative model comprises:
training the generative model on the set of data samples;
updating the generative model to add a set of new hidden units and connections to the generative model; and
training the generative model based on the set of constraints by modifying weights for the set of new hidden units.

2. The method of claim 1, wherein the set of constraints comprises a set of tolerances for the constraints, wherein training the generative model comprises training the generative model until a difference between each constraint of the set of constraints falls within a corresponding tolerance of the set of tolerances.

3. The method of claim 1, wherein each constraint of the set of constraints is weighted to adjust for relative importance of the constraint.

4. The method of claim 1, wherein training the generative model further comprises:
training a first model on the set of data samples; and
perturbing the first model using the set of constraints to result in the trained generative model.

5. The method of claim 4, wherein perturbing the first model comprises minimizing a loss function that balances the set of constraints with a difference between the generative model and the perturbed model.

6. The method of claim 1, wherein training the generative model further comprises training a model using the set of data samples and a loss function that incorporates the set of constraints as a penalty term.

7. The method of claim 1, wherein:
the set of constraints comprises a set of functionals that map probability densities to real numbers; and
training the generative model comprises enforcing that the set of functionals attains particular values.

8. The method of claim 1, wherein:
the set of constraints comprises at least one composite constraint; and
the at least one composite constraint is a function of a plurality of variables.

9. The method of claim 1, wherein the generative model is at least one of the group consisting of a recurrent neural network, a Boltzmann machine, a restricted Boltzmann machine, a generative adversarial network, and a variational autoencoder.

10. The method of claim 1, wherein modifying weights is only performed for the set of new hidden units.

11. The method of claim 1, wherein training the generative model further comprises:
training a surrogate model to score generative models as a function of weights of the generative models; and
training the generative model based on the set of data samples, the set of constraints, and the surrogate model.

12. The method of claim 1, further comprising generating, using the trained generative model, a set of samples based on the second distribution.

13. The method of claim 12, wherein:
the set of data samples are from a clinical trial of a treatment for a first population segment;
the set of constraints comprises a set of summary statistics of a different second population segment; and
the generated set of samples predicts effects of the treatment for the different second population segment.

14. A non-transitory machine-readable medium containing processor instructions for training a constrained generative model, where execution of the instructions by a processor causes the processor to perform a process that comprises:
receiving a set of data samples from a first distribution;
identifying a set of constraints from a second distribution; and
training a generative model based on the set of data samples and the set of constraints, wherein:
the generative model is a neural network comprising hidden units; and
training the generative model comprises:
training the generative model on the set of data samples;
updating the generative model to add a set of new hidden units and connections to the generative model; and
training the generative model based on the set of constraints by modifying weights for the set of new hidden units.

15. The non-transitory machine-readable medium of claim 14, wherein the set of constraints comprises a set of tolerances for the set of constraints, wherein training the generative model comprises training the generative model until a difference between each constraint of the set of constraints falls within a corresponding tolerance of the set of tolerances.

16. The non-transitory machine-readable medium of claim 14, wherein training the generative model comprises:
training a first model on the set of data samples; and
perturbing the first model using the set of constraints to result in the trained generative model.

17. The non-transitory machine-readable medium of claim 16, wherein perturbing the first model comprises minimizing a loss function that balances the set of constraints with a difference between the first generative model and the perturbed model.

18. The non-transitory machine-readable medium of claim 14, wherein training the generative model comprises training a model using the set of data samples and a loss function that incorporates the set of constraints as a penalty term.

19. The non-transitory machine-readable medium of claim 14, further comprising generating, using the trained generative model, a set of samples based on the second distribution.

20. The non-transitory machine-readable medium of claim 19, wherein:
- the set of data samples are from a clinical trial of a treatment for a first population segment;
- the set of constraints comprises a set of summary statistics of a different second population segment, and
- the generated set of samples predicts effects of the treatment for the different second population segment.

* * * * *